US012706843B2

(12) United States Patent
Maciocco et al.

(10) Patent No.: US 12,706,843 B2
(45) Date of Patent: Aug. 11, 2026

(54) ADAPTIVE RESILIENT NETWORK COMMUNICATION

(71) Applicant: Intel Corporation, Santa Clara, CA (US)

(72) Inventors: Christian Maciocco, Portland, OR (US); Ren Wang, Portland, OR (US); Kshitij Arun Doshi, Tempe, AZ (US); Francesc Guim Bernat, Barcelona (ES); Ned M. Smith, Beaverton, OR (US); Satish Chandra Jha, Portland, OR (US); Vesh Raj Sharma Banjade, Portland, OR (US); S M Iftekharul Alam, Hillsboro, OR (US); Shu-ping Yeh, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 44 days.

(21) Appl. No.: 17/853,331

(22) Filed: Jun. 29, 2022

(65) Prior Publication Data

US 2022/0329522 A1 Oct. 13, 2022

(51) Int. Cl.
*H04L 45/00* (2022.01)
*H04L 41/16* (2022.01)
*H04L 43/08* (2022.01)

(52) U.S. Cl.
CPC .............. *H04L 45/70* (2013.01); *H04L 41/16* (2013.01); *H04L 43/08* (2013.01)

(58) Field of Classification Search
None
See application file for complete search history.

(56) References Cited

U.S. PATENT DOCUMENTS

| | | | | |
|---|---|---|---|---|
| 10,867,036 | B2 * | 12/2020 | Komarek | H04L 67/535 |
| 10,999,189 | B2 * | 5/2021 | Musku | H04L 45/302 |
| 11,424,976 | B1 * | 8/2022 | Adamo | H04L 41/04 |
| 11,557,383 | B2 * | 1/2023 | Cantillon | G16H 40/67 |
| 11,805,048 | B1 * | 10/2023 | Means | H04L 45/124 |
| 2006/0291502 | A1 * | 12/2006 | Kalofonos | H04L 67/14 370/352 |
| 2010/0250387 | A1 * | 9/2010 | Kassaei | G06Q 40/00 705/26.1 |
| 2012/0044804 | A1 * | 2/2012 | Rahman | H04L 45/22 370/225 |
| 2017/0006147 | A1 * | 1/2017 | Plumb | H04L 65/1069 |
| 2017/0250855 | A1 * | 8/2017 | Patil | H04L 41/064 |
| 2018/0191550 | A1 * | 7/2018 | Vempati | H04W 76/45 |
| 2019/0124094 | A1 * | 4/2019 | Jusko | H04L 63/101 |

(Continued)

*Primary Examiner* — Lonnie V Sweet

(74) *Attorney, Agent, or Firm* — Schwegman Lundberg & Woessner, P.A.

(57) ABSTRACT

Disclosed are systems and methods for adaptive resilient network communication. A system may monitor network traffic on multiple pathways between user equipment and an application or a service at a network destination, gather network telemetry data from the monitored network traffic, input the network telemetry data into a trained artificial intelligence model, and classify the network telemetry data using the model. The system may further determine, using the model, an anomaly condition in at least a portion of the multiple pathways, and in response to the determination of an anomaly, select a mitigation technique for the at least a portion of the multiple pathways.

23 Claims, 10 Drawing Sheets

(56) References Cited

U.S. PATENT DOCUMENTS

| | | | | |
|---|---|---|---|---|
| 2019/0182127 | A1* | 6/2019 | Pignataro | H04L 41/5025 |
| 2019/0190794 | A1* | 6/2019 | McGrew | H04L 63/14 |
| 2019/0190961 | A1* | 6/2019 | McGrew | H04L 67/141 |
| 2020/0344150 | A1* | 10/2020 | Vasseur | H04L 45/64 |
| 2021/0081815 | A1* | 3/2021 | Baum | G06Q 10/06 |
| 2021/0176114 | A1* | 6/2021 | Hsu | H04L 41/0631 |
| 2021/0314232 | A1* | 10/2021 | Nainar | H04L 45/64 |
| 2021/0342205 | A1* | 11/2021 | Mcguinness | G06F 3/0616 |
| 2021/0351989 | A1* | 11/2021 | Toy | H04L 47/83 |
| 2022/0014948 | A1* | 1/2022 | Smith | H04W 72/56 |
| 2022/0070193 | A1* | 3/2022 | Konda | G06N 3/04 |
| 2022/0188450 | A1* | 6/2022 | Singh | G06F 21/46 |
| 2022/0192641 | A1* | 6/2022 | Freeman | A61B 5/4523 |
| 2022/0247618 | A1* | 8/2022 | Côté | H04L 41/16 |
| 2022/0308952 | A1* | 9/2022 | Ni | G06F 40/30 |
| 2022/0366677 | A1* | 11/2022 | Kim | G06V 20/70 |
| 2023/0143729 | A1* | 5/2023 | Zohoorian | H04W 36/00837 455/432.1 |
| 2023/0176562 | A1* | 6/2023 | Eichler | G05B 23/0235 700/80 |
| 2023/0179613 | A1* | 6/2023 | Andrews | H04L 63/1416 726/23 |
| 2023/0188455 | A1* | 6/2023 | Vasseur | H04L 41/5009 370/229 |
| 2023/0333745 | A1* | 10/2023 | Chen | G06F 3/0659 |
| 2024/0191620 | A1* | 6/2024 | Miller | E21B 47/16 |

* cited by examiner

ADAPTIVE RESILIENT NETWORK COMMUNICATION

TECHNICAL FIELD

The present disclosure relates to network communication resiliency between source and destination devices communicating through networks.

BACKGROUND

As more and more devices are network connected, allowing the devices (e.g., clients, or network devices such as routers) with supporting network interfaces to simultaneously access different wired or wireless networks via multiple wired or radio links, measures to provide network resilience have been implemented. Network resilience involves the use of measures implemented in the network infrastructure, such as software-defined wide area network (WAN) path selection, which allows the network to recover from small system faults, such as faults on a single network device or between multiple devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
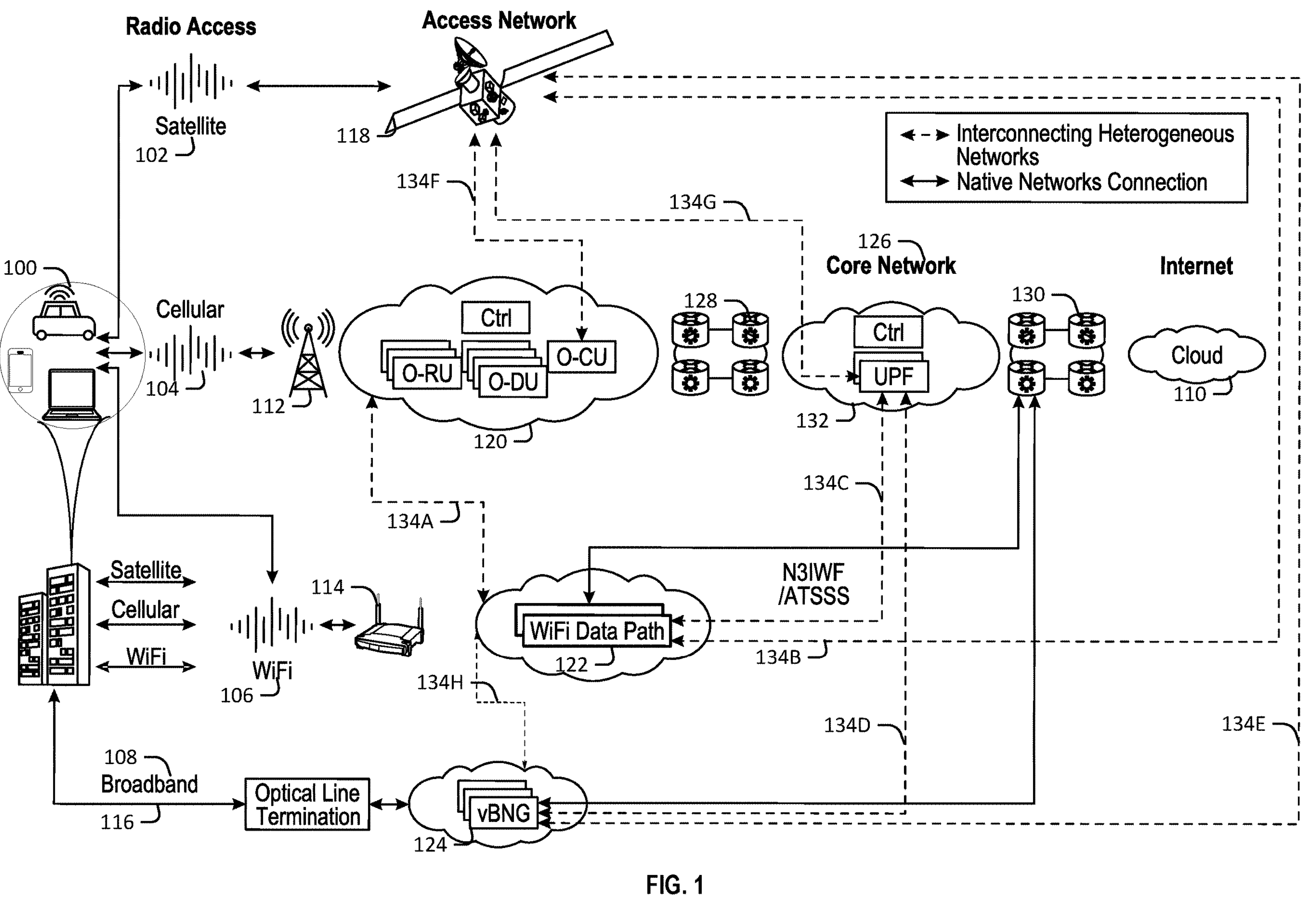
FIG. 1 illustrates an example of interconnected heterogeneous networks.

Transparent network resiliency is a key goal for next generation networks. The goal is to provide a network on which network services, applications, and end users can always achieve a high and consistent level of connectivity and communication. Network functionality from the Radio Access Network (RAN) to the mobile core is increasingly implemented using software-based solutions, such as a software defined network (SDN) and cloud native principles, in addition to services and applications using Virtual Machines (VMs) or Containers (e.g., micro-services) for programmability and scalability of the network functions and applications.

Network resilience or resiliency refers to the use of measures implemented in the network infrastructure that allows the network to recover from system faults (e.g., faults on a single network device or between devices that may cause a slow network connection or some packet loss but will not result in a device being disconnected from the network) without requiring the use of duplicate hardware or software (or the replacement of hardware or software).

Some attempts at network resiliency have been tried using both hardware-based and software-based solutions. For example, some approaches have proposed use of active-active redundancy (in which an active primary and an active backup system serve clients simultaneously and interchangeably so if one system fails, clients or services are migrated to the remaining active system) or active-passive redundancy (in which the primary system is active and the backup system is passive, and only the active system serves clients, applications, or the like, and if the active system fails, the backup system activates and clients and services are migrated to the backup system) to detect network failure and switch clients or services to other devices or systems. Also, software-based solutions attempt to use a software orchestrator to assess a failure and recommend actions to resolve or fix the issue.

Such existing approaches have various disadvantages. For example, the hardware or software resources that provide the desired level of redundancy is very expensive. Also, the centralized approach for the software-based solution driven by the orchestrator does not scale for a network-wide solution and may itself be a single point of failure. Furthermore, while active-passive redundancy requires the use of fewer resources, it requires time to initialize the backup system and risks interrupting or losing a session state. While active-active redundancy has fast failover (the capability to move functionality to a backup system in the event of a failure), it requires more active resources and thus more computing resources, computing power, or the like.

The presently disclosed systems and methods improve network communication resiliency over these and similar approaches. The disclosed systems and methods introduce resiliency between source and destination devices by using proactive multi-network connectivity monitored or controlled by Artificial Intelligence (AI) or Machine Learning (ML) models, which analyze data collected over a mesh of homogeneous or heterogeneous interconnected networks. The multi-network connectivity system may utilize optimally distributed and replicated micro-services based network functions, augmented by a combination of protocol enhancements to further improve resiliency. These architecture and mechanisms provide increased resiliency to failures in the network(s) or network function(s) failures to which devices are connected that may significantly improve an end-user's experience. Features of such a system, discussed in further detail below, may include:

- End-to-end network resiliency obtained by using AI or ML to drive a decision to turn multi-network connectivity on or off along the network path;
- Network reliability and resiliency may be improved by enabling the appropriate type of multi-network connectivity based on the desired level of resiliency and at the appropriate time to optimize resources;
- Micro-services based network functions that may be duplicated and distributed through various heterogeneous networks and activated at the appropriate time.

Infrastructure additions and extensions may permit autonomous and semi-autonomous adaptation to resiliency events and load imbalances with the help of these distributed, stand-by replicas; and/or Network protocol transport level optimizations provided between communicating nodes to minimize packet losses, provide user-defined level of reliability and improve latency performance.

Reliable communication, especially for wireless network connectivity, may be improved by allowing devices, clients, or network devices like routers supporting network interfaces, to simultaneously access different wireless (or wired) networks via multiple radio (or wired) links. Standard specifications, such as those from 3GPP™, defines dual-connectivity in cellular networks with access to both the cellular and the Wi-Fi radios through Non-3 GPP Internetworking Function (N3IWF) specification or Access Traffic Steering, Switching and Splitting (ATSSS) specification. Similarly, wired network standards from the Broadband Forum defines connectivity between the Broadband Network Gateway (BNG) and the User Plane Function (5G UPF). These specifications may be used by a network monitoring system to implement the multi-network connectivity mitigation techniques described herein.

It is understood that the system may monitor several different networks, which may include different types of networks. The network types may include a satellite network, a broadband network, a wireless network (e.g., a wireless Local Area Network (LAN), a wireless Metropolitan Area Network (MAN), a wireless Personal Area Network (PAN), a wireless Wide Area Network (WAN), or the like), or a cellular or mobile network (e.g., a 4G network, a 5G network, or the like) as discussed below, and that the pathways discussed may include a path, a component (e.g., a router, a socket, a node, etc.), a link, a function, a specification, or the like for one or more of the several different networks.

The mitigation techniques may include connecting the user equipment from a particular pathway of the multiple pathways to a second particular pathway and routing at least a portion of data or traffic from the user equipment to the second particular pathway. Stated another way, the user equipment may be connected to an active pathway of the multiple pathway, and the mitigation technique may include activating or adding a second particular pathway of the multiple pathways or replicating at least a portion of the first particular pathway. Then, the mitigation technique may further include routing at least a portion of data or traffic from the user equipment on the second particular pathway or the replicated portion of the first particular pathway.

Additionally, or alternatively, the mitigation technique may include replicating or adding at least one of a network service, a network resource, or a network component and migrating at least one of a task, at least a portion of the monitored network traffic, or data from the user equipment to the at least one of the replicated or added network service, network resource, or network component. Thus, based on the fault, the mitigation technique may include taking an alternate path which may utilize alternate hardware and/or software.

FIG. 1 illustrates an example of interconnected heterogeneous networks. A system for adaptive resilient network protocols may monitor network traffic on multiple pathways between user equipment 100 and an application or service at a network destination. As illustrated in FIG. 1, the user equipment 100 may include individual devices such as a computer, a cellular phone, a tablet, or a vehicle connected with wireless connectivity, or may include multiple devices such as all the computers or similar devices located in a building, such as an office building, a stadium, a mall, a garage, or the like. The user equipment 100 may have connectivity with networks of different types such as a satellite network 102, a mobile or cellular network 104, a wireless network 106, or a wired network such as a broadband network 108. The network destination may include an internet connected cloud service 110, or any similar destination. The user equipment 100 may be connected to the various networks through native network connections (as illustrated by the solid interconnecting lines) via different access points. For example, the user equipment 100 may be connected to the satellite network 102 through radio access, be connected to the cellular network 104 via communication with a cell tower 112, to the wireless network 106 via a router 114, and to the broadband network 108 via a wired connection such as an optical line 116.

The access points for each type of network may connect to a corresponding access network, which may include various components. For example, the radio access point for the satellite network 102 may connect via a transmission signal to a satellite 118 (e.g., offered by a low-earth orbit (LEO) satellite constellation), cell tower 112 may connect to one or more control units 120 (e.g., Open Centralized Units (O-CU), Open Distributed Units (O-DU), Open Radio Units (O-RU) or other similar architecture). Similarly, the wireless network 106 may include an access network that includes a wireless data path 122 (e.g., a Wi-Fi® data path), and the broadband network 108 may include a Virtual Broadband Network Gateway (vBNG) 124.

The various access networks may be connected to a core network 126 such as through one or more routers 128, and the core network 126 may in turn connect to a particular service provider or other networks, such as the internet or the internet-connected cloud service 110, such as via one or more additional routers 130. The core network 126 may also include one or more additional control units 132 (e.g., a User Plane Function (UPF) or other similar control). As illustrated in FIG. 1, the various networks may be connected, forming a multi-network connectivity such as through native network connection (as illustrated by the solid interconnecting lines) or otherwise communicatively coupled to each other by interconnecting components of the heterogeneous networks using different communication paths or connections (as illustrated by the dashed interconnecting lines 134A-134H). For example, the wireless data path 122 may be connected to the vBNG 124 using connection 134H and/or the one or more additional control units 132 using connection 134C in the cellular network 104. Additionally, or alternatively, the one or more additional control units 132 may be communicatively coupled to the physical satellite 118 using connection 134G which, in turn, may be connected to the one or more control units 120 using connection 134F. The vBNG 124 may be connected to the one or more additional routers 130, which connects the core network 126 to the internet-connected cloud service 110.

It is understood that any of the components of the various networks may be coupled to each other and/or coupled to the user equipment 100 whether the user equipment 100 is located on a premises such as in a building or located independently of other devices such as a traveling vehicle. The network monitoring system may gather network telemetry data (e.g., channel quality, real-time network load, a sub-network condition, a node radiality, etc.) from monitored network traffic on any connection or pathway or from any component on any of the networks connected to the user equipment 100. As discussed below, the gathered network telemetry data may be classified and inputted into a trained AI or ML model, and the model may be used to determine an anomaly condition, defect, fault, or the like (e.g., data or packet loss, network congestion, lag or latency, or any other undesired network condition) in at least a portion of the multiple pathways. It is understood that the multiple pathways may include one or more of the access points for the various networks, the access networks, the core network 126, a network endpoint, or any path therebetween in any of the networks, and may include any components of any of the networks or pathways as described above. The network monitoring system may then, in response to the determined anomaly, select a mitigation technique for at least one pathway of the multiple pathways.

Thus, the various heterogeneous networks may be connected in a hierarchy through the native network connections or the interconnections 134A-134H, and the components in each of the heterogenous networks may be distributed elements that are capable of communicating with each other. The network monitoring system may represent a federated and cooperative monitoring system with the ability to implement mitigation techniques across levels of the hierarchy (e.g., in a north-south or an east-west direction). The pathways or connections can be a communication pathway, and the pathways may have a specific or a particular type (e.g., radio, Bluetooth®, infrared, etc.). It is understood that the connection and pathway types are exemplary and as new types of pathways or connections are created, the network monitoring system may use the new pathway or connection types to implement the methods and operations discussed herein. The hardware components of the various networks may communicate with each other such that a mitigation technique applied in one portion of a pathway (e.g., the one or more additional routers 130) may be communicated to other components (e.g., the one or more control units 120) and may cause additional mitigation or adjustments to be made in the other components.

The network monitoring system may include or utilize AI and/or ML algorithms to analyze data (e.g., network telemetry data) collected from the network(s) to employ (or decide whether to employ) multi-network connectivity. The algorithms may include trained or untrained neural or machine learning algorithms, Deep Neural Networks (DNN), supervised or unsupervised learning algorithms, or any form of AI and/or ML algorithms. The types of data or information analyzed by the AI/ML algorithms may include operational data, metadata, coupling data, policy or setting data, or any desired forms of data.

Multi-Network connectivity over different networks, such as those illustrated and discussed in FIG. 1, may offer multiple levels of redundancy, such as:

- Redundantly transmitting the same data flow over different paths, or a subset of the data to improve reliability for important traffic;
- Simultaneously transmitting data flows that are cross-encoded over different paths;
- Utilizing multi-path connectivity with one active path and multiple stand-by paths where control channels are established, and data copies are stored for stand-by links to enable fast cross-path retransmission when active path(s) fails (or appears to fail); and/or
- Proactively establishing multiple control channels to enable fast path switching or handover.

A policy may be set to specify and manage the required level of reliability. The policy may define a level of "aggressiveness" (e.g., a strength, robustness, or the like) of multi-network connectivity by specifying one or more dynamic settings which may indicate various levels of tolerance, or tolerance settings. When the tolerance settings are exceeded, a policy engine may trigger one or more steps to "turn on" or implement, increase the degree of, or to change options for the multi-network connectivity. For example, the policy engine may initiate an exploration process or procedure to identify possible or candidate paths or links for establishing the multi-network connectivity. The tolerance settings may be monitored by hardware or devices such as a smart network interface card (Smart-NIC), an infrastructure processing unit (IPU), or by software. The settings may vary in number so that multiple facets of reliable communication may be covered. The settings may include:

- A setting to indicate an amount of data lag in either absolute, relative, or statistical measures;
- A setting to control an amount of data loss that is tolerable or allowable. The data loss may be measured in an absolute number of bytes or a number of microseconds of transactional updates that are outstanding or unfinished; and/or
- A time threshold between receiving a heartbeat (e.g., receiving a network packet) from a peer microservice.

In an example, the policy may be set by a policy orchestrator, engine, or apparatus, which may also dynamically set or fix the settings. Upon a determination by the policy engine that one or more settings have been exceeded, the policy engine may control or orchestrate multi-network connectivity to balance between energy efficiency required to run or operate concurrent radios and desired reliability. In an example, a user or operator may accept, reject, add to, adjust, or the like, the tolerance settings for determining when to turn off, increase, or decrease the degree of multi-network connectivity. In turn, this data may be used to train the AI or ML algorithm.

The network monitoring system may also collect and utilize both current and historical operational data. The operational data may be stored and analyzed within some window of time or within some time frame from when it is collected. The analysis may take place within a small window of time (e.g., in real-time or near real time, within minutes, etc.) or may be stored and analyzed at some later point, (e.g., days later, months later, etc.). The data may be analyzed at any point in time from its collection as desired.

The operational data may be analyzed to identify or determine breaks in one or more of the heterogenous networks or breaks from an establish trend or pattern (e.g., trends in network traffic, trends in network load, connectivity trends, or the like) of one or more of the heterogeneous networks, that may be reduced or aggregated and stored (e.g., in a database included in or communicatively coupled to the network monitoring system). Data stored and analyzed at some point after its collection may be considered historical data from which the trends discussed may be determined.

The trends may be used, in conjunction with other information, by the network monitoring system to predict a need for a mitigation technique at some point in the future. The other information may include a location of the user equipment 100. For example, the network monitoring system may determine that the user equipment 100 is currently located in a downtown area, and may know, determine, or find from the historical data that in the area there is a large amount of network traffic at the start of the workday (e.g., 8:00 AM). Then the network monitoring system may determine that a mitigation technique may be required to complete a task, route data, etc. In another example, when the user equipment is a vehicle connected to one of the networks, e.g., connected to the wireless network 106, the network monitoring system may detect that the vehicle is approaching an area with limited wireless connectivity (e.g., a tunnel). In response to detecting that the vehicle is approaching such an area, the network monitoring system may determine that the vehicle should connect to a different network such as the satellite network 102.

During collection of the operational data, various measures, either derived, calibrated, and/or categorized may be obtained and/or analyzed, including:

Traffic Patterns—Identifying which path(s) experience or are experiencing high traffic volume, which path(s) have the shortest distance, whether default path(s) are saturated or underutilized, which alternate path(s) are saturated or underutilized, durations of burst activity on the path(s), an amount of isochronous versus non-isochronous traffic volume, or the like;

Network Load—For any network(s), collection and/or analysis of Element-wise, Channel-wise, and/or hierarchical measures of bandwidth imposed, utilized, or invoked, percentage utilization of the network(s), latency distributions or percentile values for the network(s), Packet drops at various points, etc.;

Errors and Exceptions—A collection and/or analysis of data errors of various types (e.g., Denial of Service (DNS) errors, connection errors, application errors, etc.), failures to meet latency targets leading to Service Level Agreement (SLA) or Quality of Service (QOS) violations, security exceptions or violations, session timeouts, or any similar errors or exceptions;

User Trajectories—The outcome of a combination of latent user preferences and the latent user environment that users are exposed to in their navigation;

Densities of Traffic Types— Data, Video, Audio, Image, Sensor outputs, Human-to-Machine (H2M), Machine-to-Machine (M2M), Human-to-Human (H2H), Originating source types, operations logs, etc. The densities may be known or estimated; and/or External Events—Data regarding an event occurring in a specific location, such as a sporting event or some other event such as a demonstration, rally, etc., in which large numbers of people may be utilizing the homogeneous network(s).

In an example, data identified as historical data (e.g., data that is collected at some point in the past or collected before a certain point in time) may be subject to deeper analysis, a higher level of analysis, more analysis, etc., to identify durable patterns and/or relationships. In contrast, current operational data (e.g., data collected in real-time, near real-time, or collected after some point in time) may be more lightly or quickly analyzed to obtain, determine, or make a quick identification of patterns or trends in the network(s).

The network monitoring system may also collect and analyze metadata or semantic attributes of the network(s) and, based on the analysis, accelerate or implement low-latency multi-network connectivity management by capturing and signaling various resiliency relevant qualities of information being sent and received by the network(s). Such qualities of information that may be determined include:

Types of data that is important to keep accurate;

The data that can tolerate errors or can be quickly reconstructed;

Content that requires protection from malicious attempts (e.g., jamming) and thus should be sent or transmitted over multiple channels or multi-spectrum;

Usage context for the data;

The type of information is contained in a given unit of communication (e.g., audio or video versus text); and/or Whether and how the importance of the data changes with latency (e.g., does the importance of the data change with age or as it becomes less current).

When the policy requires use of multi-radio concurrently to provide increased reliability, the network monitoring system may implement various schemes, including:

Use of adaptive and/or increased level of Forward Error Correction (FEC) on redundant channel(s). This may be guided by International Network Telecommunication (INT) Standards;

Duplication of transmitted data on different channels;

Use of different transmission schemes (e.g., duplicate and repeat transmission) spread over multiple bands in the channel;

Applying network coding across packets sent over different links or paths; and/or Apportioning different bandwidths to the same data elements staggered over different channels to save capacity of slower channels when higher bandwidth channels successfully transfer data (based on receiver feedback). The higher bandwidth channels may include a higher FEC budget.

A multi-layer Discovery and Context Monitoring Protocol (DCMP) may be utilized to maintain information about status, availability, quality, and probability of failure, degradation, or congestion, etc., of links or paths in the network(s). The DCMP may allow for immediate or prioritized selection of alternate or redundant links or paths when a fault or other similar issue is detected. This may aid in reducing or minimizing latency when switching to the alternate link or path.

The DCMP may use information collected and available in real-time or near real-time to implement or recommend a mitigation technique. The mitigation techniques may include switching from a current data path to an alternate (e.g., a faster, better, more efficient, etc.) data path (or an alternate connectivity or alternate Radio Access Technology (RAT)). The mitigation technique may further include adding redundant paths or connectivity for critical data, recommending a need for, or causing Micro-Services redistribution or replication, or recommending a need for, or implementing Infrastructure additions, extensions, or changes, etc. Hence, the DCMP may identify situations in the network(s) potentially requiring the implementation of measures such as:

Path switching or addition of redundant path(s) to maintain end-to-end performance (e.g., minimizing packet losses, providing a user-defined level of reliability or resiliency, improving latency performance, or ensuring paths with proper security or privacy);

Micro-Services redistribution or replication; and/or

Infrastructure additions and extensions.

The DCMP may provide a mechanism to acquire and maintain information such as availability of possible redundant and/or alternative links or paths over heterogeneous RATs in proximity, a security health and communication quality of the links or paths (e.g., the probability of attack, congestion, or outage over the links or paths), evolving traffic patterns, latency trends, packet loss rate over the links or paths, or any other similar or desired information about the links or paths of the network(s).

The DCMP may include one or more engines or components (e.g., logical entities) for the monitoring and discovery of network issues (e.g., faults, anomalies, or the like), characterization of the issues, assessing the impact of the issues, and recommending or implementing one or more mitigating steps to resolve or minimize the impact of the issues. The different layers may correspond to different portions of the multiple paths and/or the homogeneous networks described in FIG. 1. The mitigation steps may include switching to an alternate path or connectivity mode, creating one or more additional paths, micro-services redistribution or replication, or the like. Different mitigation steps may be implemented at different layers of the DCMP, and mitigation steps may be implemented in a coordinated manner at the different layers of the DCMP. For example, the mitigation steps from one layer may be implemented before mitigation steps from another layer. Additionally, or alternatively, mitigation steps from different layers may be implemented at the same time, or substantially the same time as each other.

Figure 2:
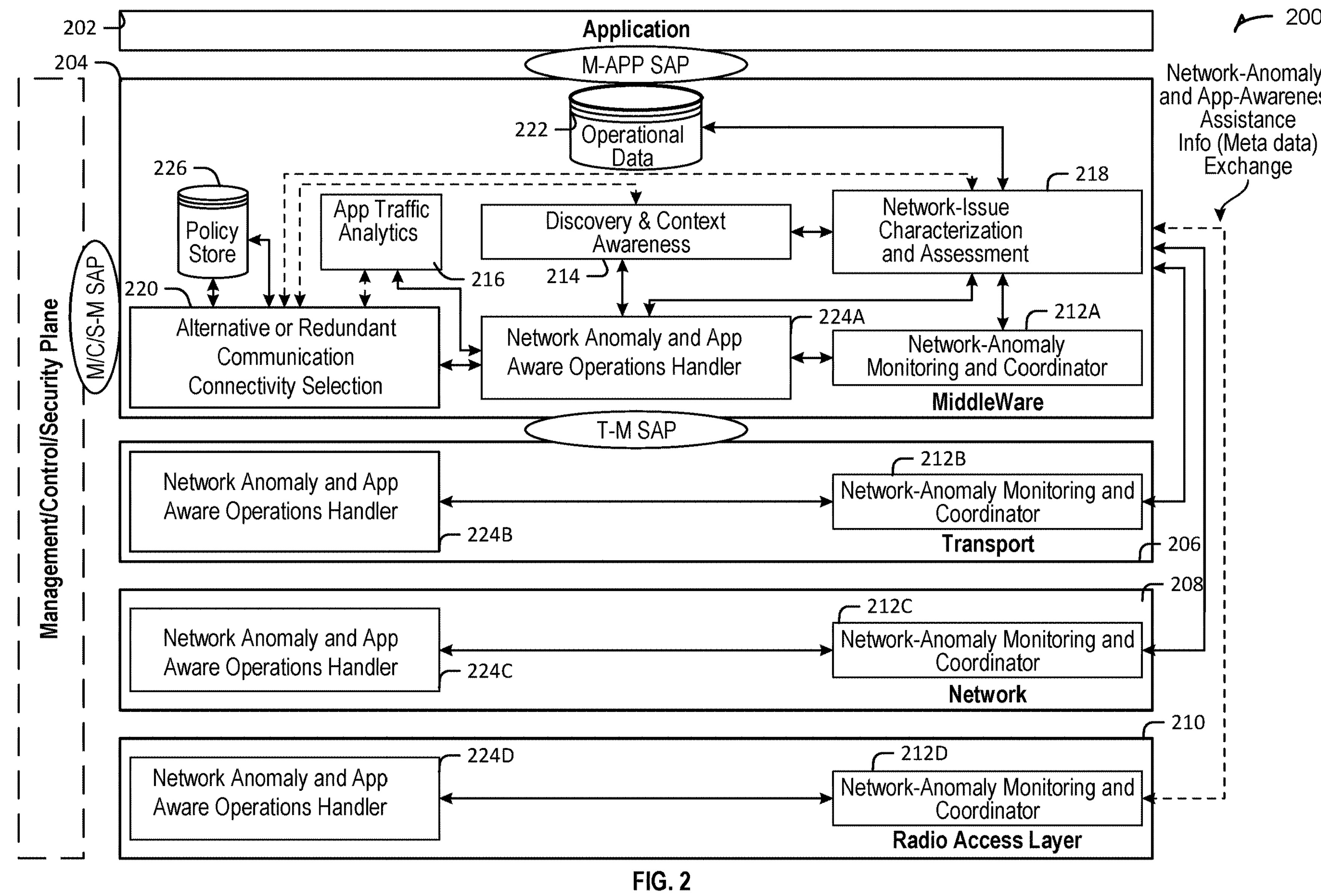
FIG. 2 illustrates an example of a multi-layer Discovery and Context Monitoring Protocol (DCPM) framework.

FIG. 2 illustrates an example of a multi-layer Discovery and Context Monitoring Protocol (DCMP) framework. As illustrated in FIG. 2, the layers of the DCMP may be located within the control or management plane 200 of a network. The control or management plane 200 may perform traffic management functions for the network including security, routing, load balancing, and/or analysis. The DCMP may include an application layer 202, a middleware layer 204, a transport layer 206, a network layer 208, and a radio access layer 210. The layers of the DCMP may implement operations to detect, monitor, or predict network issues or anomalies and may recommend or implement mitigation steps such as switching data links or paths, requiring or adding redundant links or paths, micro-services redistribution or replication, infrastructure additions or extensions, or any appropriate or desired mitigation steps. In an example, the mitigation steps may be implemented independently of each other, or concurrently with one another.

Information from across the different layers may be collected (e.g., as the network telemetry data described above) and then aggregated at the middleware layer 204 to acquire Network Context and Situational Awareness Information (NC SAI). The middleware layer 204 may include a Network Anomaly Monitoring Coordinator component 212A, or other similar logical entity which may periodically, recurrently, and/or on an event-triggered basis share NCSAI with other nodes in the network, such as nodes within a certain proximity.

The middleware layer 204 may further include a discovery and context awareness component 214 that may collect and analyze information from other components on the middleware layer 204 and then update the NC SAI. An App Traffic Analytics component 216 also located on the middleware layer 204 may extract end-to-end QoS or other attributes of the packet or application, and a Network Issue Characterization and Assessment component 218 may assess the impact of network issues or anomalies on active communication links and determine a need for mitigation steps such as implementing (or altering, changing, modifying, etc.) distribution of active micro-services or the need for infrastructure additions or extension.

Outputs from the App Traffic Analytics component 216 and the Network Issue Characterization and Assessment component 218 along with NCSAI and stored policies may be used by an Alternative or Redundant Communication Connectivity Selection and Micro-Services Redistribution component 220 to decide, determine, or recommend proper actions (e.g., mitigation steps) to handle, resolve, or lessen the impact of a network issue or anomaly. The various components of the middleware layer 204 may also analyze operational data, which may be historical data, stored in a database 222 which may be on the middleware layer 204 or communicatively coupled to the components on the middleware layer 204.

The DCMP may also facilitate or aid mechanisms to convey such determinations or decisions to one or more of the transport layer 206, the radio access layer 210 (or any other access layer), the network layer 208, or any desired layer, to provide information (e.g., meta data) to execute the decision at one or more layers. As also illustrated in FIG. 2, Network Anomaly Monitoring Coordinators 212A-212D may be present at each layer to share anomality indicators or detection data and to coordinate actions across the layers to execute the mitigation steps, such as switching paths, adding-redundant path(s), or the like, and a Network Anomaly and App-Aware Operations Handler 224A-224D may be included on one or more of the layers to ensure realization of selected mitigation steps or actions. In an example, the Network Anomaly and App-Aware Operations Handlers 224A-224D may implement different operations depending on which layer it is located on or receiving information from. For example, the Network Anomaly and App-Aware Operations Handler 224A on the middleware layer 204 may perform operations such as data duplication, repetition, and buffering. The Network Anomaly and App-Aware Operations Handler 224B on the transport layer 206 may perform operations such as network congestion control, or implementing a packet drop policy. The Network Anomaly and App-Aware Operations Handler 224C on the network layer 208 may perform operations such as content, traffic, or data forwarding or prioritization. The Network Anomaly and App-Aware Operations Handler 224D on the radio access layer 210 may perform operations such as policy enforcement (e.g., enforcing a QoS or SLA policy from the application or another service, or from a policy store 226 located on the middleware layer 204), or implementing multi-network connectivity such as at the user equipment 100 level (e.g., switching the user equipment 100 from one type of network to another or activating a second network connection and sending data or traffic across both networks).

It is understood that there is no specific flow of data between the particular components in the layers of the DCMP. The data may be collected and analyzed together, in a holistic manner to determine whether an anomaly is present or, in the case of analysis of older, historical data, whether an anomaly pattern may be identified. Thus, the network monitoring system may identify causal and incidental relationships to identify an anomaly or an anomaly pattern. In an example, a behavior at one layer, such as the network layer 208 may not itself be flagged as an anomalistic behavior but when combined or observed in conjunction with behavior at another layer such as the radio access layer 210, may be flagged as an anomaly. Thus, depending on what conditions are observed in what layer(s) the network monitoring system may determine and/or implement or recommend an appropriate mitigation step(s) depending on the identified anomalistic condition(s).

The mitigation steps may include:

switching of data path or addition of redundant data path(s);

Implementing or recommending Micro-Services redistribution or replication; and/or Implementation or recommendation for Infrastructure additions and extensions.

In an example, when a path of the multiple pathways is protected by a transparent Virtual Private Network (VPN) layer, stand-by channels may perform an authentication and a symmetric key exchange, but may not allocate the actual channel to the tenant. As a result, other tenants may utilize or use the channel when it is not in use or being utilized by the first tenant. However, when a roll over event is triggered and a real resource is needed, the end-to-end security context is already cached and available for use. Negotiating distinct session keys may assist to ensure there is not a chance for replay or a Man in the Middle (MITM) attack should an attacker gain access to stand-by keys. Furthermore, a pre-established session may be utilized in which a symmetric key keeps rolling into a new symmetric key at a randomly chosen period or interval, without allocating the channel. Stated another way, a new symmetric key may be generated at random in a pre-established session without the channel being allocated for use by a tenant utilizing a VPN. The authentication and key exchange process may be implemented after the standby channel is activated so that the standby channel(s) must be activated first and then authentication and key exchange process may be implemented.

Different types of AI or ML tools may be used to identify conditions and appropriately configure resilient multi-network connectivity. AI or ML models for anomaly detections may be used to determine when to trigger changes of multi-network connectivity configuration by identifying data patterns before or prior to link failure or before performance degradation occurs. The AI or ML models may be part of (e.g., a component of) the Network Issue Characterization and Assessment component 220. Historical network performance data may be used to create a time-series prediction model that may predict a normal or an acceptable criterion (e.g., a range or set of network conditions) and different multi-network connectivity reconfigurations may be triggered when observed network performance deviates from the acceptable criterion. For example, the reconfiguration may be implemented when observed network performance goes beyond or falls below certain one or more pre-configured thresholds.

Another useful AI or ML tool is reinforcement learning (RL) which may train an AI or ML model to determine one or more policies for resilient multi-network connectivity configurations. RL-based algorithms learn by interacting with the environment and updating its policies towards the direction with increasing reward. For resilient multi-network connectivity, the reward metric for an RL model may be defined as minimizing packet loss rate, minimizing packet delay violation rate, minimizing connection interruption time, etc.

AI or ML based models may be used to optimize decisions to enable multi-network connectivity with proper resiliency enhancement based on policies, (e.g., that power saving and/or bandwidth savings are maximized and optimized to handle transient fluctuations in quality without reacting strongly, dual radio operations due to reliability constraints, etc.). AI or ML models may be trained on policy data and may be used to infer or estimate traffic prediction, network status prediction, or the like, thus providing guidelines for conditions to enable multi-network connectivity and determine which resilient mode to use (e.g., which mitigation step(s) to implement or employ).

The AI or ML models may compute a risk score (e.g., an inferred risk score) for a data flow over a specific network or networks and the proper multi-network connectivity transmission mode may be selected based on the risk score and/or other network conditions, such as current network performance, network latency, etc. Further, the models may receive multiple (e.g., two or more) thresholding values from session context; the two thresholding values to and ti may be applied together with the inferred risk score.

When the inferred risk score is below the lower thresholding value to, then the risk score may be used to bias against multi-network connectivity operation (e.g., against implementing a mitigation step). Conversely, when the inferred risk score is above the higher thresholding value ti, then that may be used to strongly bias towards multi-network connectivity (e.g., toward implementing a mitigation step). When the inferred risk score falls between the thresholding values, then an inference is drawn more frequently (the risk score is computed more frequently) until a moving window average for the risk score, along with the latest value of the risk score itself, has either dropped below to or crossed above ti. After a multi-network connectivity mitigation step is chosen for a session for which the previous default was not to implement multi-network connectivity, the risk score may be similarly re-evaluated with the thresholds, but now the two thresholds may provide hysteresis in the reverse direction. Such a system may offer an infrastructure provider the ability to implement policies in which resiliency at the network level is offered as a QoS resource offered to premium tenants or workloads.

Figure 3:
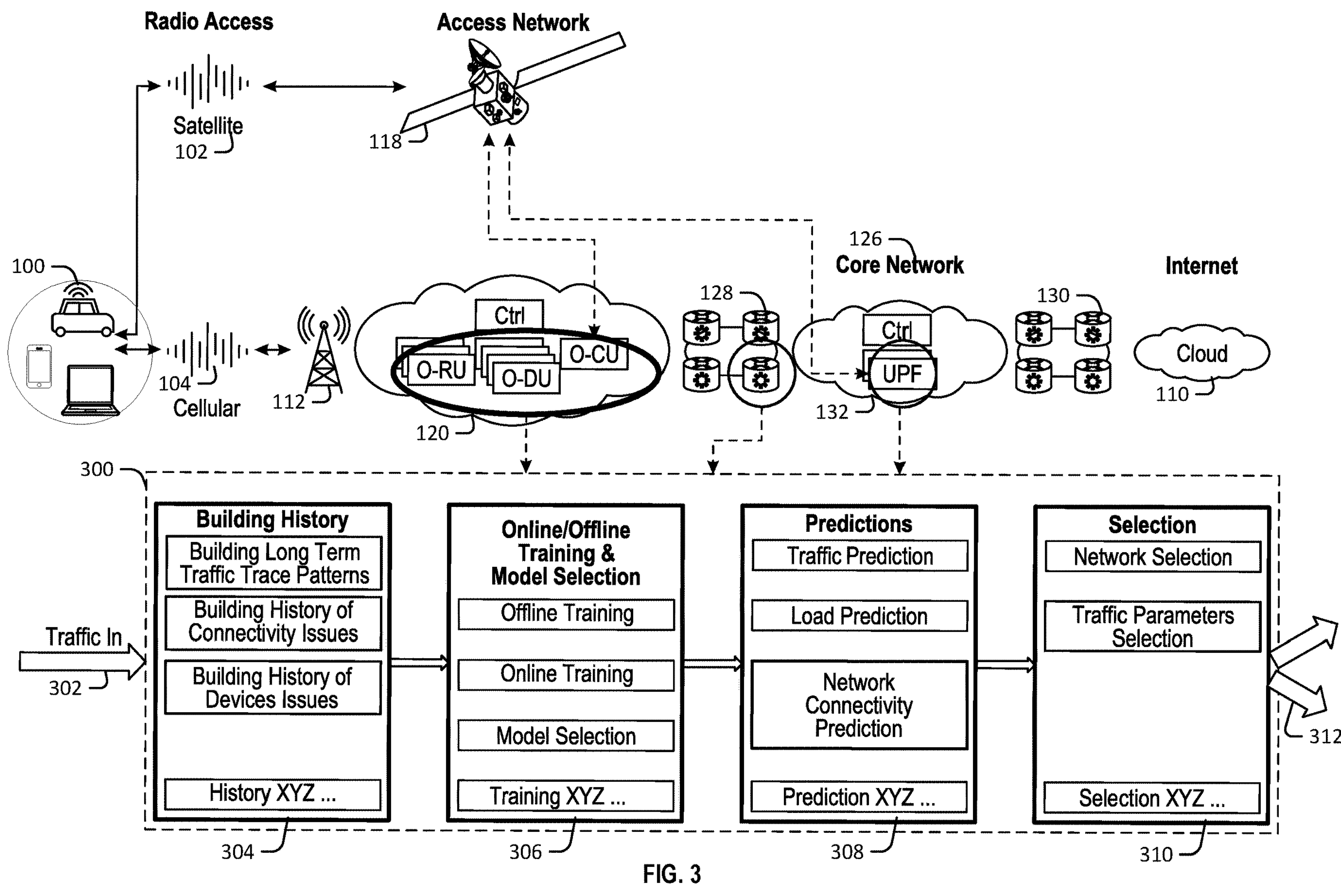
FIG. 3 illustrates an example of internal processing blocks to improve reliability of network devices using artificial intelligence (AI) or machine learning (ML) functionality.

FIG. 3 illustrates an example of internal processing blocks of a decision making model 300 to improve reliability of network devices using AI or ML functionality. As illustrated in FIG. 3, the decision making model 300 may receive traffic 302 or data (e.g., network telemetry data) from one or more of the different networks and/or the different pathways or components of the different networks described above in FIG. 1. For example, the traffic 302 may be received from the one or more control units 120 in the cellular network 104, the one or more routers 128 connecting the cellular access network to the core network 126, the one or more additional control units 132 of the core network 126, or the like. To conserve space in the figure, only the satellite network 102 and the cellular network 104 and some of the components illustrated in FIG. 1 are reproduced, but it is understood that the traffic 302 that the decision making model 300 receives may be from any of the networks described herein (or any networks similar to those), and from any of the pathways and/or components (or any similar pathways and components) of the networks.

Returning to FIG. 3, the decision making model 300 may include one or more processing components or blocks such as a building history block 304, a training model selection block 306, a prediction block 308, or a selection block 310. It is also understood that the decision making model 300 may include additional processing blocks in place of or in addition to the blocks illustrated in FIG. 3, or that some operations performed in the blocks may be consolidated, replaced, or omitted during processing by the decision making model 300, which may depend at least in part on the type of traffic 302 being received by the decision making model 300.

The building history block 304 may determine historical or long-term patterns from the traffic 302. The patterns may include long-term network traffic patterns (e.g., determining times of day when network traffic increases, decreases, changes suddenly, or the like in an area), patterns or history of connectivity issues (e.g., determining whether one or more of the networks experience connectivity issues at particular times, on particular days, etc.), patterns or history of device issues (e.g., whether one or more devices connected to the various networks such as the user equipment 100 experience issues at certain times or in certain locations), or any other desired or useful categories or parameters that may be obtained from the traffic 302.

The training model selection block 306 may take the pattern data from the building history block 304 and use the pattern data to train the decision making model 300. The training may include offline and/or online training and may include selection of a training model (e.g., a logistic regression model, binary classification, multiclass classification, K-Nearest Neighbor (KNN), or any appropriate model). The model may be supervised or unsupervised. In addition, certain types of pattern data may be analyzed by a supervised learning model or algorithm, while other types of pattern data may be analyzed by an unsupervised model or algorithm, as desired. Once a training type and model selection is made by the training model selection block 306, the pattern data may be supplied to the prediction block 308 at which the decision making model 300 may predict parameters such as network traffic, network load, and/or network connectivity at a certain time, (e.g., at some point in the future from when the traffic 302 is collected). The time may be a time frame that is a small amount of time from when the traffic 302 is collected (e.g., minutes) or may be at some point farther removed from when the traffic 302 is collected (e.g., later in the day, days or even weeks later).

The prediction may be made based on the traffic 302 and information regarding the location of the user equipment 100. For example, the decision making model 300 may collect (or the traffic 302 may include) data from a Global Positioning Device (GPS) or component included on the user equipment 100 to determine where the user equipment 100 is currently located. The decision making model 300 may also have information about the location, for example, if there is some kind of event or occurrence that will occur at or near the location, and base the predictions on future network traffic, network load, and/or network connectivity based on the event. For example, if the user equipment 100 is located near a stadium, the network monitoring system may consider the fact that a game is scheduled to occur at the stadium, which may cause an increase in network traffic on one or more of the networks during the game.

In response to a prediction being made at the prediction block 308, the decision making model 300 may supply prediction data (e.g., the output of the prediction block 308) to the selection block 310. The selection block 310 may select one or more mitigation techniques such as selection of one or more networks on which to send data from the user equipment 100, traffic parameter selection (e.g., on which pathways in which networks to send the data, packets, or other network traffic), or any other appropriate mitigation technique. In response to the selection, the decision making model 300 may output one or more mitigation selections 312. The mitigation selections 312 may be output as a recommendation to a user interface, such as a Graphical User interface (GUI) on which a user may select or approve the one or more mitigation selections 312. Alternatively, the network monitoring system, as a part of a protocol discussed below in FIG. 4, may automatically implement one or more of the one or more mitigation selections 312 determined by the decision making model 300 without any user intervention.

The network monitoring system may, as another mitigation technique, dynamically create high occupancy lanes between a source (e.g., user equipment 100) and a destination (e.g., the core network 126 or the internet connected cloud service 110) based on factors such as network traffic, service requirements, or the like. The creation of the high occupancy lanes may include creation of 5G slices and an end-to-end path once traffic arrives at the network. The high occupancy lanes may be proactively created based on predictions made by the AI or ML algorithms. Thus, the predictions by the AI or ML algorithms may dictate when the high occupancy lanes need to be and/or are created.

The AI or ML models may cross current network utilization versus the demand that highly critical services have and predict whether an end-to-end lane needs to be created. For example, the more critical a service is and the less options to fully create high occupancy lanes are available (e.g., between one of the hops there is not QoS or resource enforcement from a network perspective), the prediction algorithm may be used to establish different high occupancy lanes (which are not 100% traffic guaranteed) and apply load balancing among them. Similarly, the AI or ML algorithms may use historical information to project the likelihood that a particular path may generate violation of SLA or QoS agreements given the current circumstances or conditions. Hence, when there are no SLA or QoS capabilities, the prediction algorithms may be used to cross application and infra telemetry to decide which path(s) to use.

The network monitoring system may also factor how networking "knobs" on the protocol layer may affect the performance and dynamically tune the knobs. The knobs may be tuned, for example, in response to SLA or QoS requirements dictated by the service. The network may provide feedback to a software stack, which may be used to change communication schemes based on the current infrastructure state. For example, if an application supports TCP and UDP, the infrastructure may provide feedback that moving from TCP to UDP is predicted to be better in terms of bandwidth versus resiliency, based for instance, on an observed drop rate at the infrastructure level. Stated another way, if conditions on the network are good (e.g., there are no packet losses, or the packet loss is at an acceptable level pursuant to a policy) the network monitoring system may switch traffic from the user equipment 100 from TCP to UDP. Conversely, if the application is using UDP and network conditions such as packet loss changes to an unacceptable level, the network monitoring system may determine a need to switch from UDP to TCP, which may offer more secure communication.

Network Functions (NF) generally include a set of micro-services which may be shadowed or mirrored. An NF may have a control copy running as a micro-service and may have one or more standby copies to take over in the event that the control copy fails. Based on a failure of the control copy, a determination may be made for one or more of the standby copies to take over based on a threshold, a policy, or a combination thereof. In an example, the NF micro-services may be tightly connected with infrastructure processing, current infrastructure states, and/or available failover mechanisms. Different applications may be tightly connected to the NF micro-services, in which case those applications may be linked into tight communication with indicators or precursors of failures or security breaches from infrastructure processing layers and to responsive actions in the infrastructure. For example, applications may include higher-level networking services (e.g., network forensics, DDoS prevention, honeypots, DPI, or the like), or they may extend core networking functions such as predicting demand bandwidth spikes and accumulating resources in advance of such spikes.

The network monitoring system may utilize or employ one or more interfaces to perform different functions. For example, an interface may allow access to infrastructure processing flows and receive or provide events and notifications that may be used by the NF micro-services and/or other network-centric applications. Another interface may allow for infrastructure sensitive NF micro-services and applications to steer various protocol adaptations in the infrastructure. Such an interface may provide options for synchronous (e.g., acknowledge, act, and notify immediately), asynchronous (acknowledge and act), and/or delayed (acknowledge and act when appropriate, such as in a next time window) modes for engaging infrastructure processing logic or components in the protocol adaptations.

In an example, when a particular NF micro-service requires tight coordination with infrastructure, to balance the load, an IPU or a Smart-NIC may:

- Monitor multiple instances of the particular NF micro-service and act as an "infrastructure sidecar" for the microservice. For example, if a first microservice needs to communicate with one or more other microservices, either on the host or remotely, the IPU may enable or assist the first microservice to communicate with the other microservices;
- Scale out the particular NF micro-service;
- Monitor the particular micro-service's operation (for each instance) to ensure the completion of a request targeting;
- Migrate the particular NF micro-service to another host or another resource pool. For example, many micro-services may be stateless or have a very well-identified, limited, state that may be conveyed to a remote pool or host for instantaneous migration and activation; and/or
- Automatically forward tasks or serverless jobs to pre-programmed pools using a next-generation Dynamic Load Balancer or Dynamic Load Balancing extension (a DLB++ extension).

In an example, for tasks, such as micro-services tasks, the DLB++ extension may include streaming multicasts for performing high-frequency tail-of-log flushes and communicate updates to distributed data. The updates may be performed with transactional boundary enforcements. Optionally, the multicasts may be performed when triggered. The triggers may be tied to various conditions including one or more of a rise in server load, detection of bandwidth limitations (e.g., congestion), detection of an increase in packet drops (e.g., a number of packet drops over a pre-determined or pre-defined number threshold, or other criterion), or the like.

Such a process represents an improvement over classic load balancing in that the heuristics for these operations are pre-programmed, the heuristics may optionally incorporate inferencing from In-band-Network-Telemetry, and the necessary state may be proactively reconstructed at replica locations. As a result, when the load-balancers migrate a task to another path, network, or the like, the relevant data (Log Structured Merge Trees (LSMs), hashes, or the like) and states are already in the new location through the DLB++ network. Handling the load balancing functions with an IPU, Smart-NIC or other programmable infrastructure may improve reaction time over other solutions. For example, solution that require processing in the host system may be slower than handling the load balancing functions with the IPU, because the IPU would have to transfer information to the host. Therefore, processing in the IPU (or directly where the information is available) may improve reaction time and overall latency In addition to or complementary to telemetry data, the network monitoring system may build a model (e.g., a graph) emulating at least one of physical network topology, path latencies, network throughputs, state reconstruction latencies, bandwidth costs, or any similar parameter. The model may be built in software or may be embedded into a Smart-NIC based program. The model may be updated with filtered or aggregated telemetry data describing one or more of compute, storage, memory network asset, or data availabilities at the node, sub-rack, rack, or multi-rack units of aggregation of resources. How the updates are to be performed may be driven by or depend upon the graph model. For example, the updates may be automated (e.g., not requiring human attention) or may contain latencies in transferring telemetry data into application software.

The graph model may further include (e.g., encode) what data may be required to be contained, run, verified, or operated in a Trusted Execution Environment (TEE), a type of TEE (e.g., what security level the TEE must have) that the data is required to be within, and what services have to be run within a particular TEE. Because compute and communication topology may change, the graph model may be revisable, and accordingly, the heuristics for filtering and aggregating telemetry data flowing into it may be revised in tandem. Thus, the job of load-balancing and auto-scaling for the purposes of achieving high levels of elasticity and uptime is simplified because the metadata required for the decisions may already pre-computed, while the data state and soft-reservations for resources may already be pre-performed through the DLB++ network.

To optimize resources utilization, not all replica paths may be in a running state but may be maintained as fungible resources available for on-demand 'stand-by' use by a different resource, communications channel, communications interface, microservice, or network connection. One or more 'replica' communications channels may be allocated and assigned a "replica priority". In response to a primary communications interface failing, the replica communications channel with the highest priority (a first replica communications channel) may be assigned to take its place. Similarly, in response to the primary communications channel and the first replica communications channel failing, the communications channel with the next highest priority (a second replica communications channel) may be assigned to take its place, and so on until the load or services may be handled.

When the replica communications channels are not in use, they may be advertised as available for 'stand-by' resource allocation. Since replica resource allocation results is an assignment of resources, when a communications channel (or other resource) is designated as a replica (e.g., by the owner), it may be 'returned' for stand-by allocation by the resource manager or orchestrator. As a stand-by resource, the resource manager assigns a second priority to the resource which corresponds to the queue of peer workloads seeking replica resources. The resource manager may not be able to assign actual resources to all the replicas and may assign from the pool of stand-by resources instead where the stand-by priority would determine which peer has first claim to the stand-by resource. The primary resource implicitly may have the highest level of priority (e.g., a level 0 priority). This approach may pre-determine how to assign stand-by resources, so the task of resource reassignment executes quickly. Unused resources in the network may be re-distributed efficiently to maximize utilization while preserving resiliency properties for the primary resource.

Standby replicas may be fully pre-imaged with baseline software components, including group security credentials, ahead of being assigned to minimize latency or lag in assigning the replicas and pressing them into operation. Additionally, or alternatively, a light-weight Real Time Operating System (RToS) may be specifically engineered, designed, utilized, or the like, for running virtual NF (VNF) micro-services so that hard resources (e.g., memory footprint) for their images is minimal and/or grows slowly, which aids in substituting a non-responsive VNF with a new or fresh replica, scaling up online by adding other resources (e.g., central processing units (CPUs) or other processors), and/or cleaning up and freeing up resources by dismantling the resource compositions quickly. Such RToS VNF resourcing containers may be pre-aggregated, stand by, micro-containers that are both easy to press into active service and able to be quickly dismantled so that resources are released with minimal overhead and latency.

Traditional end-to-end protocols such as TCP or UDP may not be suitable for the dynamic multi-network connectivity and the various reliability requirements. Also, from an application point of view, it may be difficult to take into consideration all networking conditions and make optimizations. Therefore, the presently disclosed system may utilize an optimized, end-to-end, Virtual Transport Protocol (VTP) that may hide or obscure the policy details from the application, but allows the application to input requirements (e.g., reliability requirements, latency requirements, etc.) to influence the transport behavior and to achieve system optimization.

Figure 4:
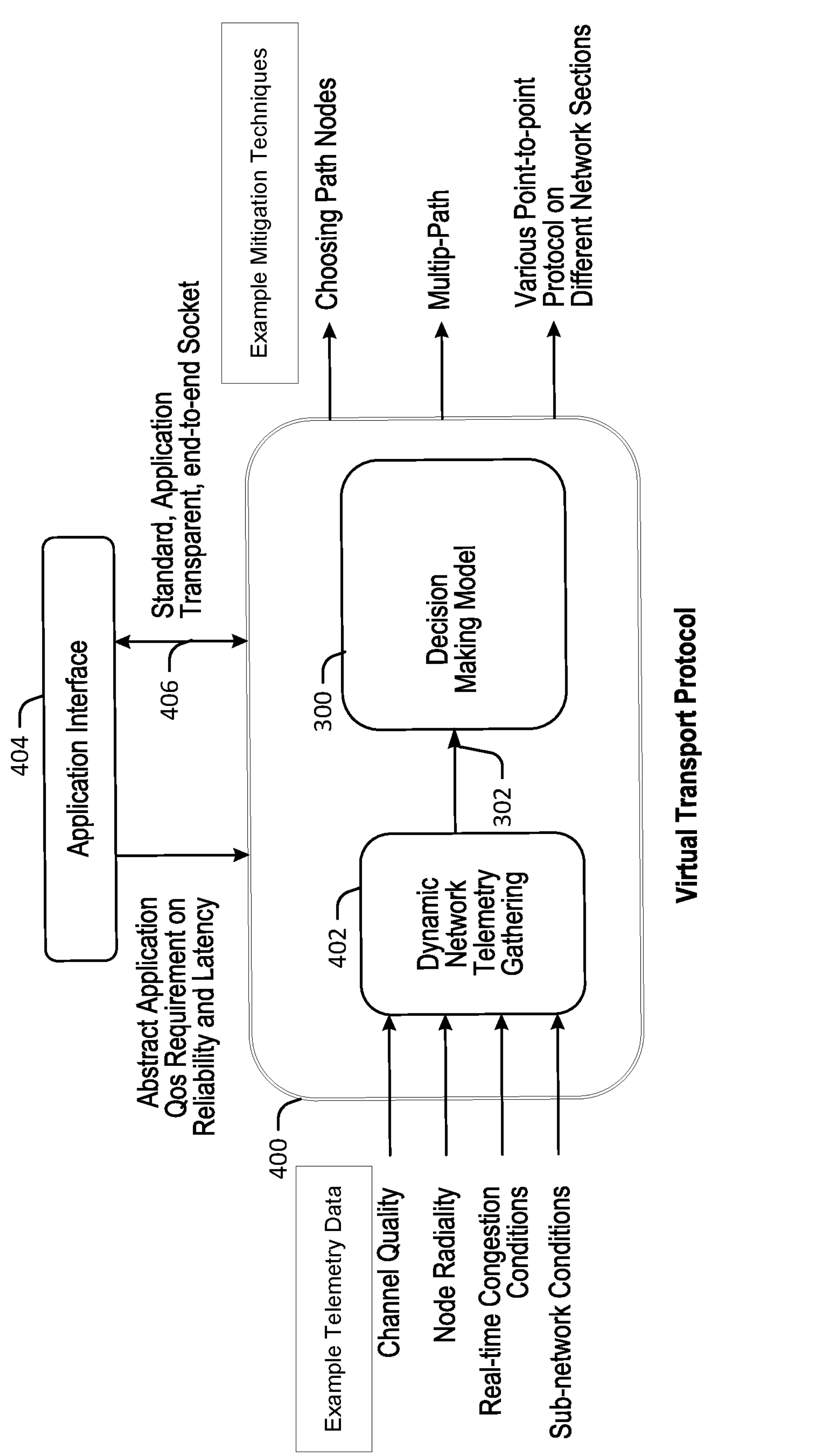
FIG. 4 illustrates an example of an optimized end-to-end Virtual Transport Protocol (VTP).

FIG. 4 illustrates an example of an optimized end-to-end Virtual Transport Protocol (VTP) 400. The VTP 400 may monitor and collect data or traffic from the various networks and components illustrated in FIG. 1, from end-to-end (e.g., from the user equipment 100 to the internet connected cloud service 110 and all of the components and pathways included between them across each of the network types). As illustrated in FIG. 4, the VTP 400 may collect network telemetry data such as data regarding channel quality, node radiality, real-time congestion conditions, sub-network conditions, or the like from the various networks (e.g., the satellite network 102, the cellular network 104, the wireless network 106 and/or the broadband network 108) and gather, aggregate, organize, classify, or the like, the network telemetry data in a dynamic network telemetry gathering component 402 or engine. The gathered network telemetry data may be submitted or input as the traffic 302 into the decision making model 300 which may be a sub-component or a sub-engine on the VTP 400.

The VTP 400 may connect to a service or an application through an application interface 404 (e.g., an Application Programming Interface (API)). Specifically, the VTP 400 may connect to the application interface 404 through a data streaming model or a standard application transparent end-to-end socket 406. The connection may allow the application to read or write data without being provided or "knowing" specific details of the network conditions of the various networks. The Application may provide its QoS or SLA requirements to the VTP 400 (e.g., reliability requirements, latency requirements, or the like) through the connection. The reliability requirements of the application may include requirements such as whether packets or data may be dropped and if so, at what rate. Some applications may still function when a portion of packets are lost and are able to recover using the remaining packets. For example, in video streaming, small portions of frames or small portions of packets containing gradient information may be lost with the application still able to function.

The VTP 400 may also monitor dynamic networking conditions, including peer-to-peer channel conditions. When channel conditions are very good or otherwise acceptable on one or more particular channels, the network monitoring system may map the channel(s) as a part of end-to-end data transport for high reliable traffic. Similarly, if a portion of the network is passing through a small high-speed data center, this portion of the sub-network may take advantage of the high speed data center's transport protocols. The radiality and/or reliability of intermediate nodes and real-time path congestion may also be monitored so the network monitoring system may provide underneath network topology and peer-to-peer protocols to achieve end-to-end transport.

The decision making model 300 may take both the application inputs received via the application interface 404 and the network conditions to map an optimal network topology that may consist of multiple portions of sub-network and determine an appropriate mitigation technique, such as determining the most appropriate transport pathway for the traffic or data and implement the appropriate mitigation techniques which may be transparent to the application. It is understood that the telemetry data and the mitigation techniques illustrated in FIG. 4 are exemplary only and are not intended to be limiting, and that other relevant or desired telemetry data may be gathered, and other mitigation techniques may be determined, recommended, or implemented.

Figure 5:
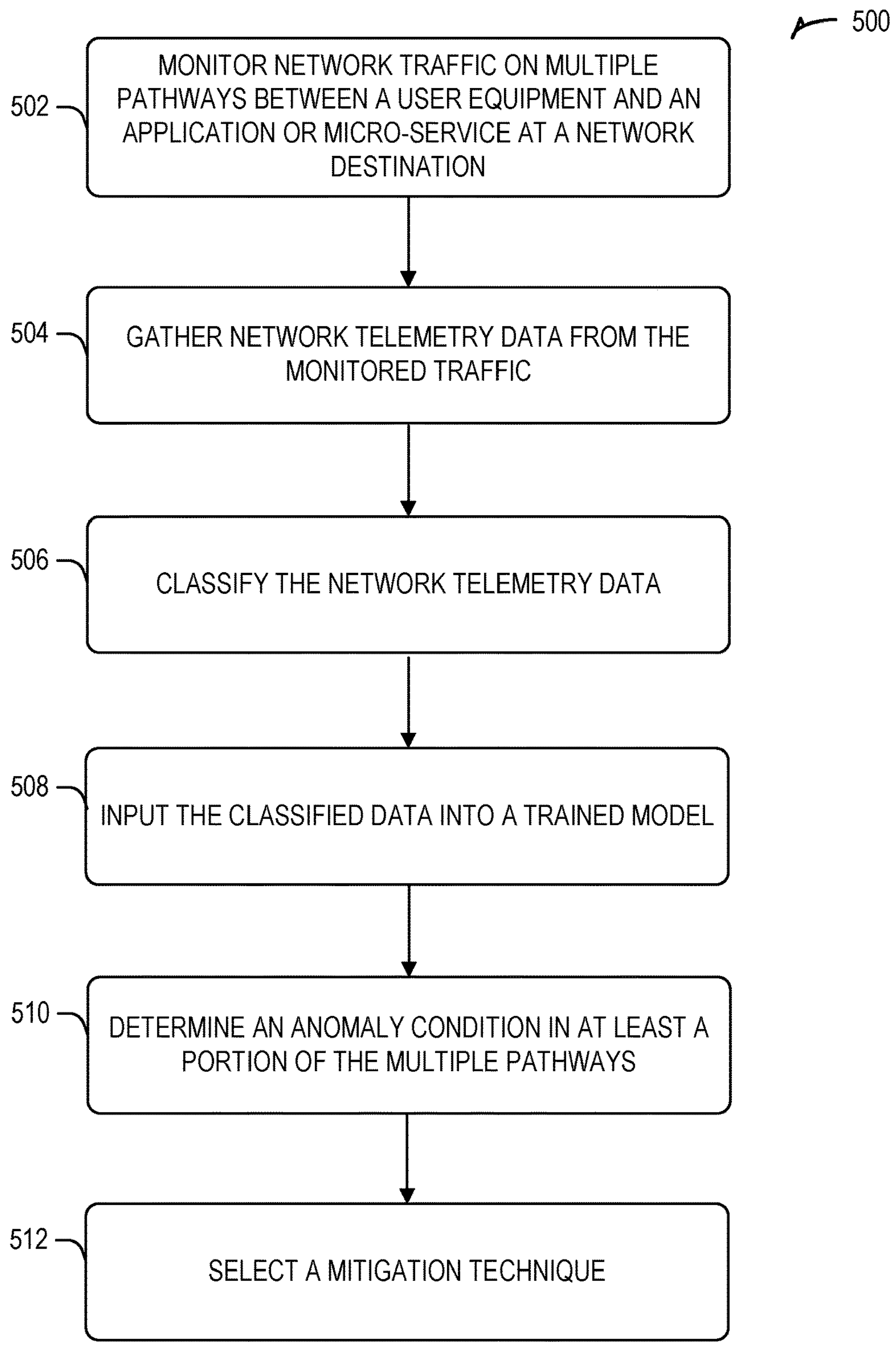
FIG. 5 illustrates an example flow diagram of a method for implementing an adaptive resilient network.

FIG. 5 illustrates an example flow diagram of a method 500 for implementing adaptive resilient network protocols. The method 500 may include a number of operations (operations 502-512), which may be carried out using a processor or processing circuitry of a computer or other similar machine. Operation 502 may include monitoring network traffic on multiple pathways between a user equipment and an application or a service or a micro-service at a network destination. The user equipment may be a user device such as a computer, tablet, mobile phone, or the like, may include multiple devices located at a particular location such as a building or a group of buildings, or may be a vehicle with the ability to connect to a network. The network may be a single network such as a wireless network, a cellular network, a satellite network, or a broadband network, or may be a collection of different networks and may include one or more pathways or components of the different networks.

Operation 504 may include gathering network telemetry data from the monitored traffic. The network telemetry data may include data regarding channel quality, node radiality, real-time congestion conditions, sub-network conditions, packet loss, a change in network traffic or network load over a period of time, or the like. Operation 506 may include classifying the network telemetry data and Operation 508 may include entering or inputting the classified data into a trained model. The trained model may be a supervised or unsupervised AI or ML model, and the training may be performed online or offline.

Operation 510 may include determining an anomaly condition in at least a portion of the multiple pathways, and Operation 512 may include selecting a mitigation technique. The anomaly condition may be determine using or based on the trained model, and the mitigation technique may be selected based on the determining by the trained model. For example, the mitigation technique selected may be based on which portion of the pathway(s) the anomaly condition occurs and/or what exactly the anomaly condition is. For example, a different mitigation technique may be selected when the anomaly is network congestion in a cellular network, than it is for packet loss on a broadband network. The anomaly condition may correspond to a current condition (e.g., a condition occurring in real-time, near real-time, or within a short or small amount or period of time from when the network telemetry data is collected). The anomaly condition may alternatively correspond to a predicted future condition for at least a portion of the multiple pathways. In such an example, the trained model may use older (e.g., non-real-time) network telemetry data and analyze the data to determine one or more patterns. The patterns may include network congestion or usage patterns, data or packet loss patterns at particular times in particular locations, or changes in network usage or any other relevant parameters over a period of time or window of time that may impact user experience. The predicted future condition may, therefore, be based at least in part on a real-time location of the user equipment.

The mitigation technique may include switching the user equipment from a first pathway of the multiple pathways to a second pathway of the multiple pathways. This may include, for example, switching the user equipment from one network type to another (e.g., from a cellular network to a satellite network) or may include switching the user equipment from a first pathway on a network to a second pathway on the same network (e.g., a second pathway on a cellular network). Or stated another way, one mitigation technique may include connecting the user equipment to a second pathway of the multiple pathways and routing at least a portion of data or traffic from the user equipment to the second pathway.

Additionally, or alternatively, the mitigation technique may include replicating or adding at least one of a network service, a network resource, or a network component and migrating at least one of a task, at least a portion of the monitored network traffic, or data from the user equipment to the replicated or added service, resource, or component. For example, a network or application service used to perform some function may be replicated, duplicated, mirrored, or the like, and at least a portion of traffic, data, packets, etc., utilizing that service may be routed or switched to the replicated, duplicated, or mirrored service to transport the traffic from the user equipment to a destination point or other end point. Additionally, or alternatively, a mitigation technique may include cross-pathway re-routing, such that if a fault occurs in an active pathway (e.g., a link from a core network to the internet goes down, loses connectivity, etc.) traffic or data may be routed to a different active pathway, which may be a different pathway type (as discussed above).

Another example mitigation technique may include adjusting a position of an antenna (e.g., a radio antenna), adjusting a portion of infrastructure (e.g., mobile infrastructure) or deploying additional infrastructure such as additional mobile access antennas or repeaters such that a stronger connection may be established with the user equipment. In another example, the mitigation technique may depend at least in part on a type of the network traffic being transmitted. For example, whether the network traffic includes streaming video or other large amounts of data, or whether the network traffic is text-based such as text messages or word processing documents.

The method 500 may optionally include determining a risk score for the network telemetry data and comparing the risk score to a criterion. The criterion may include a lower thresholding value or an upper thresholding value. Then, based on the comparison, the network monitoring system may determine the need to implement a mitigation technique and what type(s) of mitigation technique(s) to implement. For example, when the risk score falls below the lower thresholding value, the network monitoring system may determine that no mitigation technique is necessary. On the other hand, when the risk score crosses above the upper thresholding value, the network monitoring system may determine that a mitigation technique is warranted, needed, or otherwise appropriate. In such an example, the type of mitigation technique may depend on how far above the upper thresholding value the risk score falls. In a situation in which the risk score falls between the thresholding values, the risk score may be recalculated on a periodic basis or a recurrent basis until a moving window average for the risk score and a current or latest value of the risk score either drops below the lower thresholding value or crosses above the upper thresholding value.

The method 500 may further optionally include training the model. The model may be trained online or offline, and the network telemetry data may be used to train the model as it is collected (e.g., in real-time, near-real-time, or substantially close in time to when it is collected) or may be stored and used for training later in time (e.g., as historical data) after its collection. The updated trained model may then be used to determine patterns in the data, predict the need for mitigation techniques, or the like, as discussed above.

Figure 6:
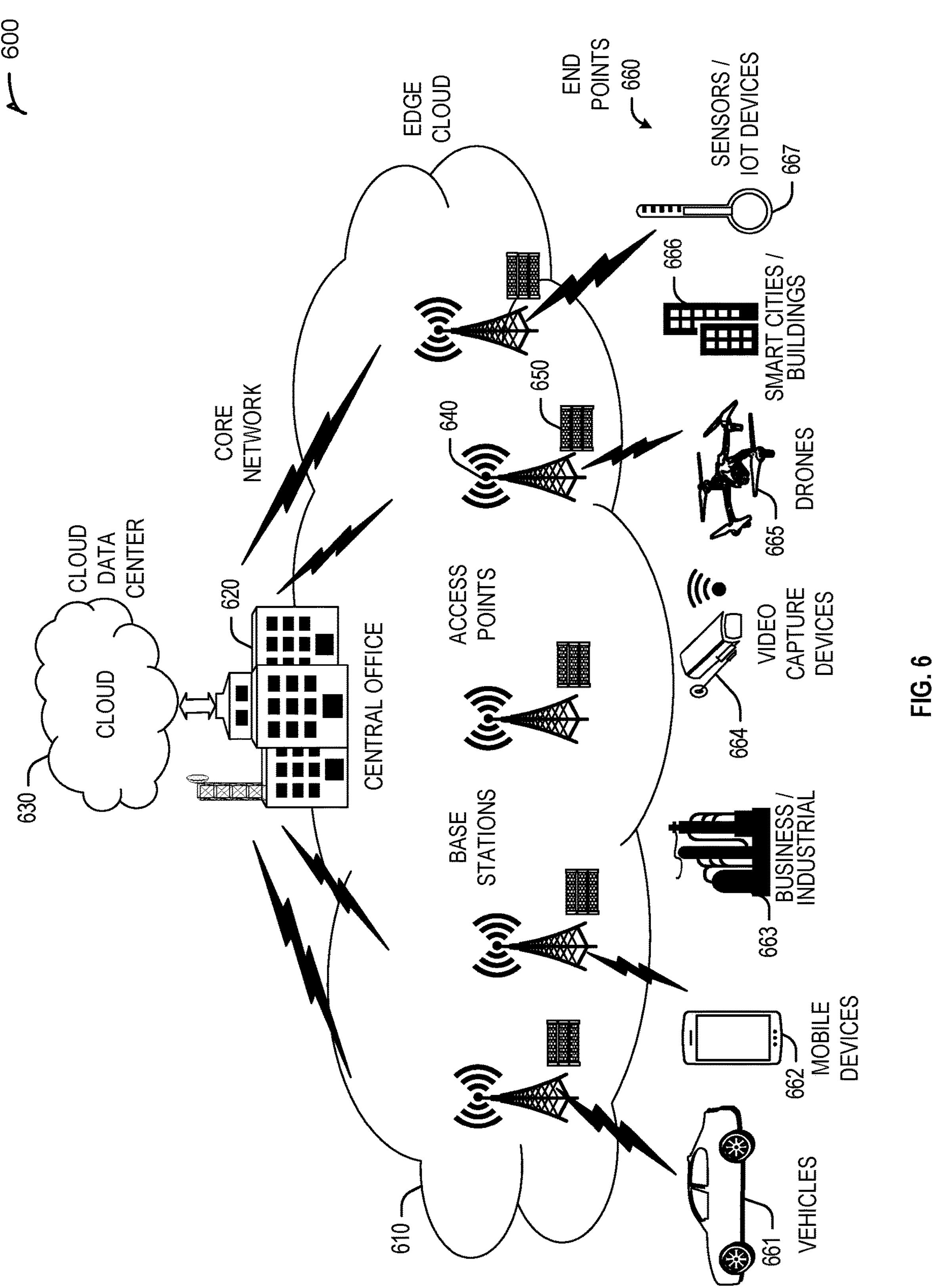
FIG. 6 illustrates an overview of an Edge cloud configuration for Edge computing.

FIG. 6 is a block diagram 600 showing an overview of a configuration for Edge computing, which includes a layer of processing referred to in many of the following examples as an "Edge cloud". As shown, the Edge cloud 610 is co-located at an Edge location, such as an access point or base station 640, a local processing hub 650, or a central office 620, and thus may include multiple entities, devices, and equipment instances. The Edge cloud 610 is located much closer to the endpoint (consumer and producer) data sources 660 (e.g., autonomous vehicles 661, user equipment 662, business and industrial equipment 663, video capture devices 664, drones 665, smart cities and building devices 666, sensors and IoT devices 667, etc.) than the cloud data center 630. Compute, memory, and storage resources which are offered at the edges in the Edge cloud 610 are critical to providing ultra-low latency response times for services and functions used by the endpoint data sources 660 as well as reduce network backhaul traffic from the Edge cloud 610 toward cloud data center 630 thus improving energy consumption and overall network usages among other benefits.

Compute, memory, and storage are scarce resources, and generally decrease depending on the Edge location (e.g., fewer processing resources being available at consumer endpoint devices, than at a base station, than at a central office). However, the closer that the Edge location is to the endpoint (e.g., user equipment (UE)), the more that space and power is often constrained. Thus, Edge computing attempts to reduce the amount of resources needed for network services, through the distribution of more resources which are located closer both geographically and in network access time. In this manner, Edge computing attempts to bring the compute resources to the workload data where appropriate or bring the workload data to the compute resources.

The following describes aspects of an Edge cloud architecture that covers multiple potential deployments and addresses restrictions that some network operators or service providers may have in their own infrastructures. These include, variation of configurations based on the Edge location (because edges at a base station level, for instance, may have more constrained performance and capabilities in a multi-tenant scenario); configurations based on the type of compute, memory, storage, fabric, acceleration, or like resources available to Edge locations, tiers of locations, or groups of locations; the service, security, and management and orchestration capabilities; and related objectives to achieve usability and performance of end services. These deployments may accomplish processing in network layers that may be considered as "near Edge", "close Edge", "local Edge", "middle Edge", or "far Edge" layers, depending on latency, distance, and timing characteristics.

Edge computing is a developing paradigm where computing is performed at or closer to the "Edge" of a network, typically through the use of a compute platform (e.g., x86 or ARM compute hardware architecture) implemented at base stations, gateways, network routers, or other devices which are much closer to endpoint devices producing and consuming the data. For example, Edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within Edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 7:
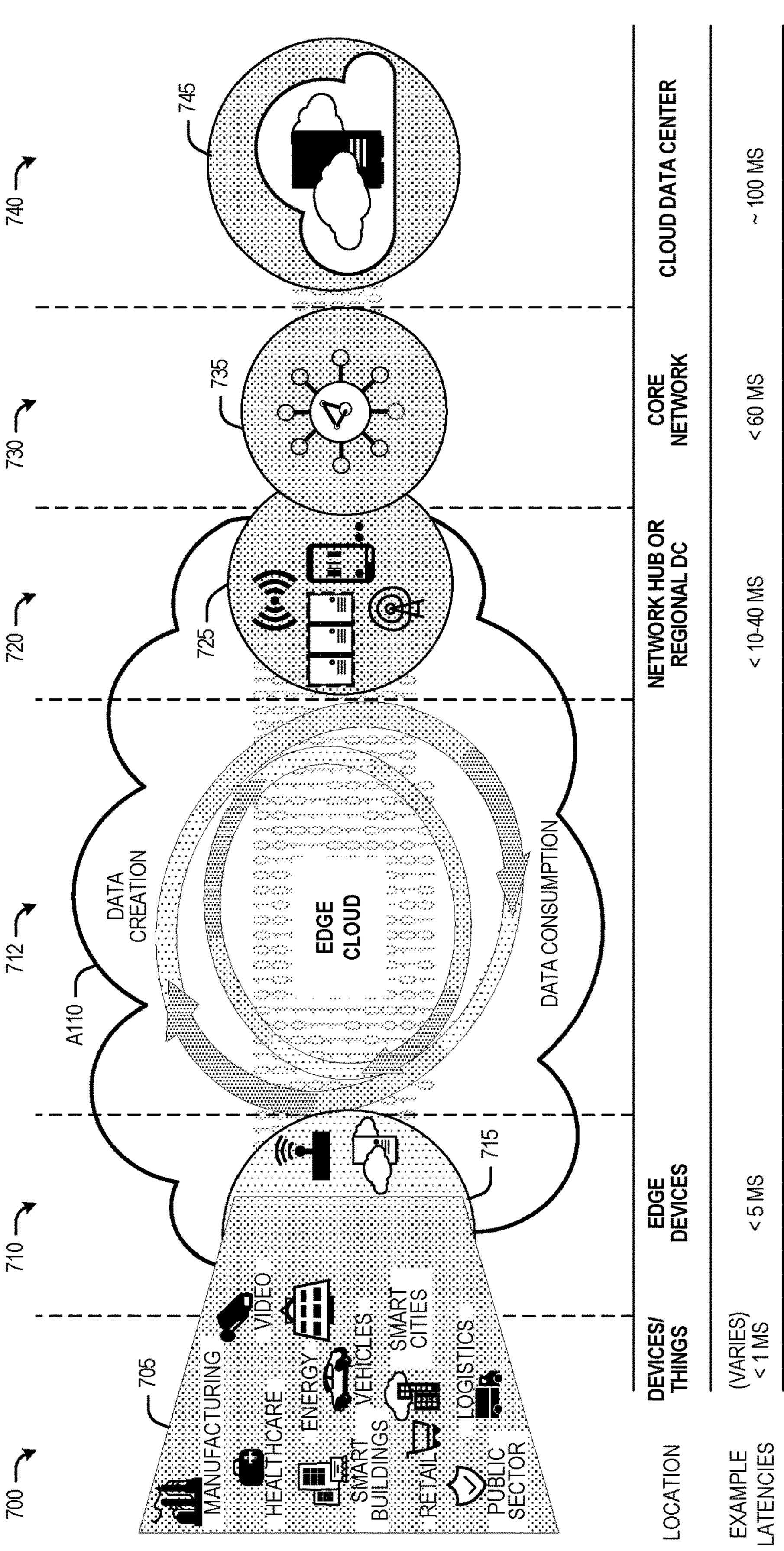
FIG. 7 illustrates operational layers among endpoints, an Edge cloud, and cloud computing environments.

FIG. 7 illustrates operational layers among endpoints, an Edge cloud, and cloud computing environments. Specifically, FIG. 7 depicts examples of computational use cases 705, utilizing the Edge cloud 610 among multiple illustrative layers of network computing. The layers begin at an endpoint (devices and things) layer 700, which accesses the Edge cloud 610 to conduct data creation, analysis, and data consumption activities. The Edge cloud 610 may span multiple network layers, such as an Edge devices layer 710 having gateways, on-premise servers, or network equipment (nodes 715) located in physically proximate Edge systems; a network access layer 720, encompassing base stations, radio processing units, network hubs, regional data centers (DC), or local network equipment (equipment 725); and any equipment, devices, or nodes located therebetween (in layer 712, not illustrated in detail). The network communications within the Edge cloud 610 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 700, under 5 ms at the Edge devices layer 710, to even between 10 to 40 ms when communicating with nodes at the network access layer 720. Beyond the Edge cloud 610 are core network 730 and cloud data center 740 layers, each with increasing latency (e.g., between 50-60 ms at the core network layer 730, to 100 or more ms at the cloud data center layer). As a result, operations at a core network data center 735 or a cloud data center 745, with latencies of at least 50 to 100 ms or more, will not be able to accomplish many time-critical functions of the use cases 705. Each of these latency values are provided for purposes of illustration and contrast; it will be understood that the use of other access network mediums and technologies may further reduce the latencies. In some examples, respective portions of the network may be categorized as "close Edge", "local Edge", "near Edge", "middle Edge", or "far Edge" layers, relative to a network source and destination. For instance, from the perspective of the core network data center 735 or a cloud data center 745, a central office or content data network may be considered as being located within a "near Edge" layer ("near" to the cloud, having high latency values when communicating with the devices and endpoints of the use cases 705), whereas an access point, base station, on-premise server, or network gateway may be considered as located within a "far Edge" layer ("far" from the cloud, having low latency values when communicating with the devices and endpoints of the use cases 705). It will be understood that other categorizations of a particular network layer as constituting a "close", "local", "near", "middle", or "far" Edge may be based on latency, distance, number of network hops, or other measurable characteristics, as measured from a source in any of the network layers 700-740.

The various use cases 705 may access resources under usage pressure from incoming streams, due to multiple services utilizing the Edge cloud. To achieve results with low latency, the services executed within the Edge cloud 610 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor, etc.).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to Service Level Agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, Edge computing within the Edge cloud 610 may provide the ability to serve and respond to multiple applications of the use cases 705 (e.g., object tracking, video surveillance, connected cars, etc.) in real-time or near real-time, and meet ultra-low latency requirements for these multiple applications. These advantages enable a whole new class of applications (e.g., Virtual Network Functions (VNFs), Function as a Service (FaaS), Edge as a Service (EaaS), standard processes, etc.), which cannot leverage conventional cloud computing due to latency or other limitations.

However, with the advantages of Edge computing comes the following caveats. The devices located at the Edge are often resource constrained and therefore there is pressure on usage of Edge resources. Typically, this is addressed through the pooling of memory and storage resources for use by multiple users (tenants) and devices. The Edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required because Edge locations may be unmanned and may even need permissioned access (e.g., when housed in a third-party location). Such issues are magnified in the Edge cloud 610 in a multi-tenant, multi-owner, or multi-access setting, where services and applications are requested by many users, especially as network usage dynamically fluctuates and the composition of the multiple stakeholders, use cases, and services changes.

At a more generic level, an Edge computing system may be described to encompass any number of deployments at the previously discussed layers operating in the Edge cloud 610 (network layers 700-740), which provide coordination from client and distributed computing devices. One or more Edge gateway nodes, one or more Edge aggregation nodes, and one or more core data centers may be distributed across layers of the network to provide an implementation of the Edge computing system by or on behalf of a telecommunication service provider ("telco", or "TSP"), internet-of-things service provider, cloud service provider (CSP), enterprise entity, or any other number of entities. Various implementations and configurations of the Edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the Edge computing system does not necessarily mean that such node or device operates in a client or agent/minion/follower role; rather, any of the nodes or devices in the Edge computing system refer to individual entities, nodes, or subsystems which include discrete or connected hardware or software configurations to facilitate or use the Edge cloud 610.

As such, the Edge cloud 610 is formed from network components and functional features operated by and within Edge gateway nodes, Edge aggregation nodes, or other Edge compute nodes among network layers 710-730. The Edge cloud 610 thus may be embodied as any type of network that provides Edge computing and/or storage resources which are proximately located to radio access network (RAN) capable endpoint devices (e.g., mobile computing devices, IoT devices, smart devices, etc.), which are discussed herein. In other words, the Edge cloud 610 may be envisioned as an "Edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks, etc.) may also be utilized in place of or in combination with such 3GPP carrier networks.

The network components of the Edge cloud 610 may be servers, multi-tenant servers, appliance computing devices, and/or any other type of computing devices. For example, the Edge cloud 610 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., electromagnetic interference (EMI), vibration, extreme temperatures, etc.), and/or enable submergibility. Example housings may include power circuitry to provide power for stationary and/or portable implementations, such as alternating current (AC) power inputs, direct current (DC) power inputs, AC/DC converter(s), DC/AC converter(s), DC/DC converter(s), power regulators, transformers, charging circuitry, batteries, wired inputs, and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, infrared or other visual thermal sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, rotors such as propellers, etc.) and/or articulating hardware (e.g., robot arms, pivotable appendages, etc.). In some circumstances, the sensors may include any type of input devices such as user interface hardware (e.g., buttons, switches, dials, sliders, microphones, etc.). In some circumstances, example housings include output devices contained in, carried by, embedded therein and/or attached thereto. Output devices may include displays, touchscreens, lights, light-emitting diodes (LEDs), speakers, input/output (I/O) ports (e.g., universal serial bus (USB)), etc. In some circumstances, Edge devices are devices presented in the network for a specific purpose (e.g., a traffic light), but may have processing and/or other capacities that may be utilized for other purposes. Such Edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 10. The Edge cloud 610 may also include one or more servers and/or one or more multi-tenant servers. Such a server may include an operating system and implement a virtual computing environment. A virtual computing environment may include a hypervisor managing (e.g., spawning, deploying, commissioning, destroying, decommissioning, etc.) one or more virtual machines, one or more containers, etc. Such virtual computing environments provide an execution environment in which one or more applications and/or other software, code, or scripts may execute while being isolated from one or more other applications, software, code, or scripts.

Figure 8:
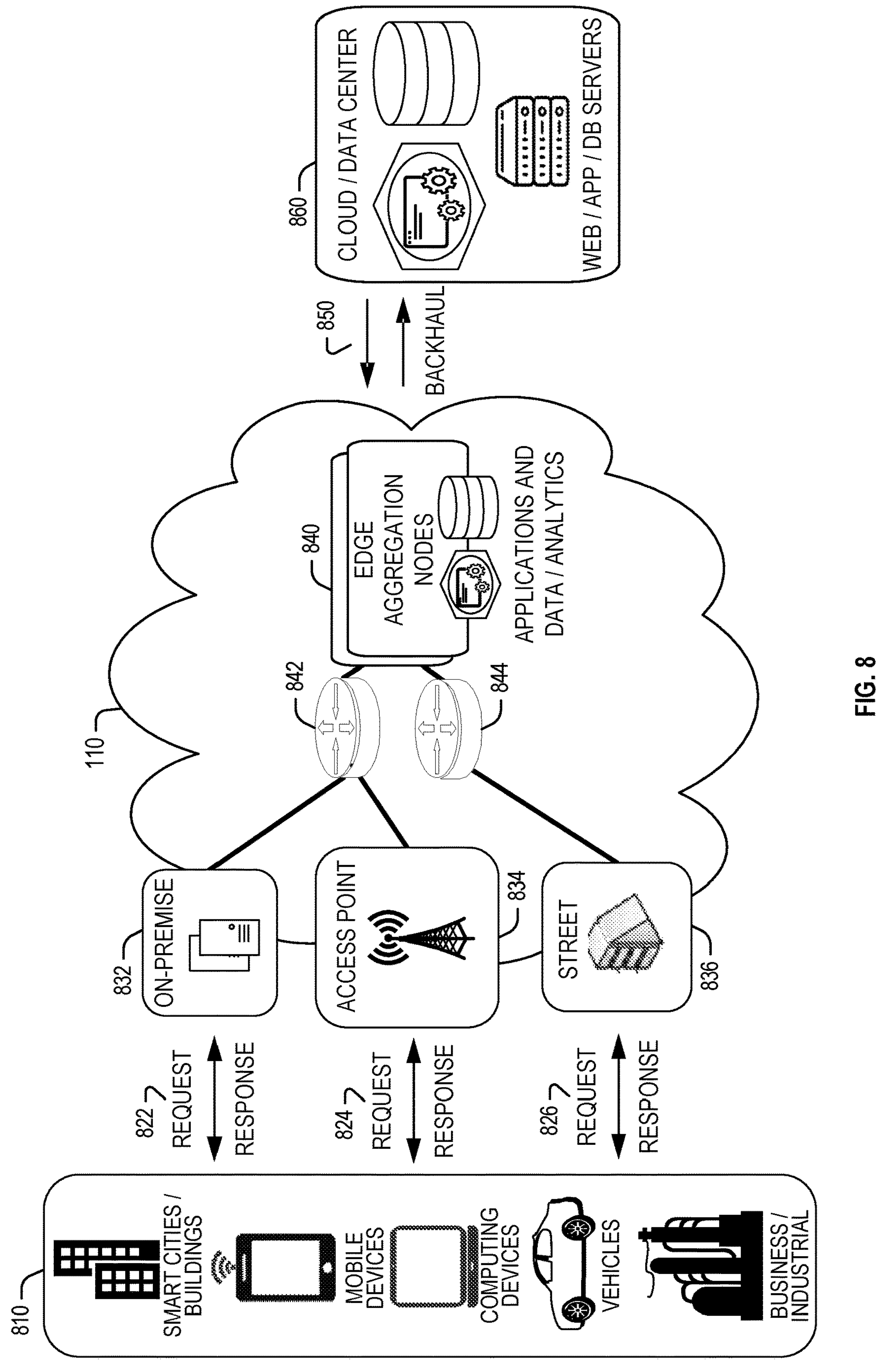
FIG. 8 illustrates an example approach for networking and services in an Edge computing system.

In FIG. 8, various client endpoints 810 (in the form of mobile devices, computers, autonomous vehicles, business computing equipment, industrial processing equipment) exchange requests and responses that are specific to the type of endpoint network aggregation. For instance, client endpoints 810 may obtain network access via a wired broadband network, by exchanging requests and responses 822 through an on-premise network system 832. Some client endpoints 810, such as mobile computing devices, may obtain network access via a wireless broadband network, by exchanging requests and responses 824 through an access point (e.g., a cellular network tower) 834. Some client endpoints 810, such as autonomous vehicles may obtain network access for requests and responses 826 via a wireless vehicular network through a street-located network system 836. However, regardless of the type of network access, the TSP may deploy aggregation points 842, 844 within the Edge cloud 610 to aggregate traffic and requests. Thus, within the Edge cloud 610, the TSP may deploy various compute and storage resources, such as at Edge aggregation nodes 840, to provide requested content. The Edge aggregation nodes 840 and other systems of the Edge cloud 610 are connected to a cloud or data center 860, which uses a backhaul network 850 to fulfill higher-latency requests from a cloud/data center for websites, applications, database servers, etc. Additional or consolidated instances of the Edge aggregation nodes 840 and the aggregation points 842, 844, including those deployed on a single server framework, may also be present within the Edge cloud 610 or other areas of the TSP infrastructure.

In further examples, any of the compute nodes or devices discussed with reference to the present Edge computing systems and environment may be fulfilled based on the components depicted in FIGS. 9 and 10. Respective Edge compute nodes may be embodied as a type of device, appliance, computer, or other "thing" capable of communicating with other Edge, networking, or endpoint components. For example, an Edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 9:
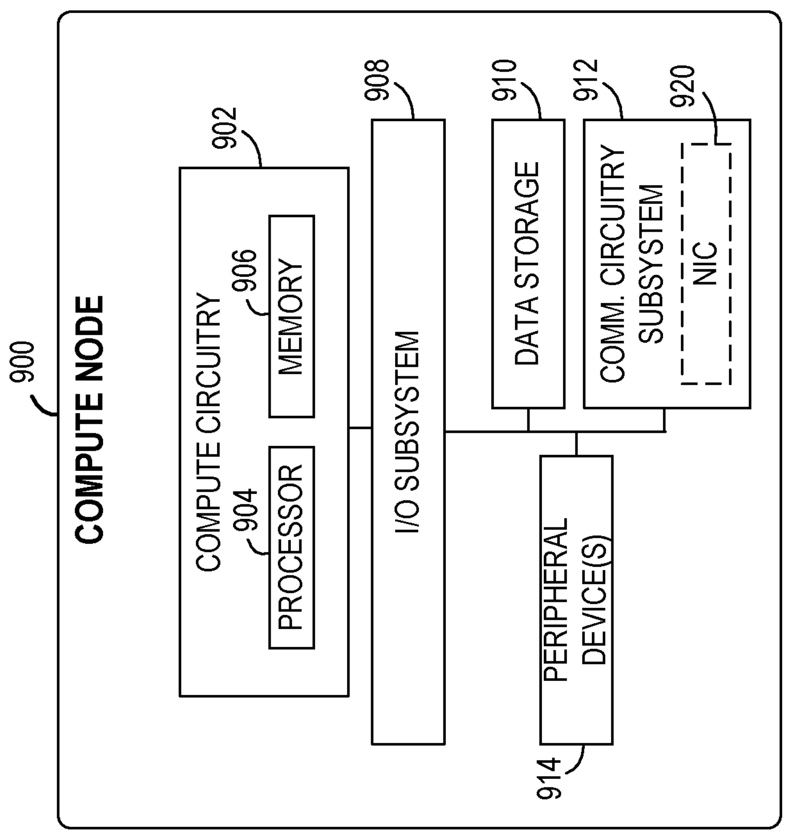
FIG. 9 provides an overview of example components for compute deployed at a compute node in an Edge computing system.

In the simplified example depicted in FIG. 9, an Edge compute node 900 includes a compute engine (also referred to herein as "compute circuitry") 902, an input/output (I/O) subsystem (also referred to herein as "I/O circuitry") 908, data storage (also referred to herein as "data storage circuitry") 910, a communication circuitry subsystem 912, and, optionally, one or more peripheral devices (also referred to herein as "peripheral device circuitry") 914. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 900 may be embodied as any type of engine, device, or collection of devices capable of performing various compute functions. In some examples, the compute node 900 may be embodied as a single device such as an integrated circuit, an embedded system, a field-programmable gate array (FPGA), a system-on-a-chip (SOC), or other integrated system or device. In the illustrative example, the compute node 900 includes or is embodied as a processor (also referred to herein as "processor circuitry") 904 and a memory (also referred to herein as "memory circuitry") 906. The processor 904 may be embodied as any type of processor(s) capable of performing the functions described herein (e.g., executing an application). For example, the processor 904 may be embodied as a multi-core processor(s), a microcontroller, a processing unit, a specialized or special purpose processing unit, or other processor or processing/controlling circuit.

In some examples, the processor 904 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 904 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, storage disks, or AI hardware (e.g., GPUs, programmed FPGAs, or ASICs tailored to implement an AI model such as a neural network). Such an xPU may be designed to receive, retrieve, and/or otherwise obtain programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that an xPU, an SOC, a CPU, and other variations of the processor 904 may work in coordination with each other to execute many types of operations and instructions within and on behalf of the compute node 900.

The memory 906 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device (e.g., memory circuitry) is any number of block addressable memory devices, such as those based on NAND or NOR technologies (for example, Single-Level Cell ("SLC"), Multi-Level Cell ("MLC"), Quad-Level Cell ("QLC"), Tri-Level Cell ("TLC"), or some other NAND). In some examples, the memory device(s) includes a byte-addressable write-in-place three dimensional crosspoint memory device, or other byte addressable write-in-place non-volatile memory (NVM) devices, such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, a combination of any of the above, or other suitable memory. A memory device may also include a three-dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may include a transistor-less stackable cross point architecture in which memory cells sit at the intersection of word lines and bit lines and are individually addressable and in which bit storage is based on a change in bulk resistance. In some examples, all or a portion of the memory 906 may be integrated into the processor 904. The memory 906 may store various software and data used during operation such as one or more applications, data operated on by the application(s), libraries, and drivers.

In some examples, resistor-based and/or transistor-less memory architectures include nanometer scale phase-change memory (PCM) devices in which a volume of phase-change material resides between at least two electrodes. Portions of the example phase-change material exhibit varying degrees of crystalline phases and amorphous phases, in which varying degrees of resistance between the at least two electrodes can be measured. In some examples, the phase-change material is a chalcogenide-based glass material. Such resistive memory devices are sometimes referred to as memristive devices that remember the history of the current that previously flowed through them. Stored data is retrieved from example PCM devices by measuring the electrical resistance, in which the crystalline phases exhibit a relatively lower resistance value(s) (e.g., logical "0") when compared to the amorphous phases having a relatively higher resistance value(s) (e.g., logical "1").

Example PCM devices store data for long periods of time (e.g., approximately 10 years at room temperature). Write operations to example PCM devices (e.g., set to logical "0", set to logical "1", set to an intermediary resistance value) are accomplished by applying one or more current pulses to the at least two electrodes, in which the pulses have a particular current magnitude and duration. For instance, a long low current pulse (SET) applied to the at least two electrodes causes the example PCM device to reside in a low-resistance crystalline state, while a comparatively short high current pulse (RESET) applied to the at least two electrodes causes the example PCM device to reside in a high-resistance amorphous state.

In some examples, implementation of PCM devices facilitates non-von Neumann computing architectures that enable in-memory computing capabilities. Generally speaking, traditional computing architectures include a central processing unit (CPU) communicatively connected to one or more memory devices via a bus. As such, a finite amount of energy and time is consumed to transfer data between the CPU and memory, which is a known bottleneck of von Neumann computing architectures. However, PCM devices minimize and, in some cases, eliminate data transfers between the CPU and memory by performing some computing operations in-memory. Stated differently, PCM devices both store information and execute computational tasks. Such non-von Neumann computing architectures may implement vectors having a relatively high dimensionality to facilitate hyperdimensional computing, such as vectors having 10,000 bits. Relatively large bit width vectors enable computing paradigms modeled after the human brain, which also processes information analogous to wide bit vectors.

The compute circuitry 902 is communicatively coupled to other components of the compute node 900 via the I/O subsystem 908, which may be embodied as circuitry and/or components to facilitate input/output operations with the compute circuitry 902 (e.g., with the processor 904 and/or the main memory 906) and other components of the compute circuitry 902. For example, the I/O subsystem 908 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 908 may form a portion of a system-on-a-chip (SoC) and be incorporated, along with one or more of the processor 904, the memory 906, and other components of the compute circuitry 902, into the compute circuitry 902.

The one or more illustrative data storage devices/disks 910 may be embodied as one or more of any type(s) of physical device(s) configured for short-term or long-term storage of data such as, for example, memory devices, memory, circuitry, memory cards, flash memory, hard disk drives (HDDs), solid-state drives (SSDs), and/or other data storage devices/disks. Individual data storage devices/disks 910 may include a system partition that stores data and firmware code for the data storage device/disk 910. Individual data storage devices/disks 910 may also include one or more operating system partitions that store data files and executables for operating systems depending on, for example, the type of compute node 900.

The communication circuitry 912 may be embodied as any communication circuit, device, or collection thereof, capable of enabling communications over a network between the compute circuitry 902 and another compute device (e.g., an Edge gateway of an implementing Edge computing system). The communication circuitry 912 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 912 includes a network interface controller (NIC) 920, which may also be referred to as a host fabric interface (HFI). The NIC 920 may be embodied as one or more add-in-boards, daughter cards, network interface cards, controller chips, chipsets, or other devices that may be used by the compute node 900 to connect with another compute device (e.g., an Edge gateway node). In some examples, the NIC 920 may be embodied as part of a system-on-a-chip (SoC) that includes one or more processors or included on a multichip package that also contains one or more processors. In some examples, the NIC 920 may include a local processor (not shown) and/or a local memory (not shown) that are both local to the NIC 920. In such examples, the local processor of the NIC 920 may be capable of performing one or more of the functions of the compute circuitry 902 described herein. Additionally, or alternatively, in such examples, the local memory of the NIC 920 may be integrated into one or more components of the client compute node at the board level, socket level, chip level, and/or other levels.

Additionally, in some examples, a respective compute node 900 may include one or more peripheral devices 914. Such peripheral devices 914 may include any type of peripheral device found in a compute device or server such as audio input devices, a display, other input/output devices, interface devices, and/or other peripheral devices, depending on the particular type of the compute node 900. In further examples, the compute node 900 may be embodied by a respective Edge compute node (whether a client, gateway, or aggregation node) in an Edge computing system or like forms of appliances, computers, subsystems, circuitry, or other components.

Figure 10:
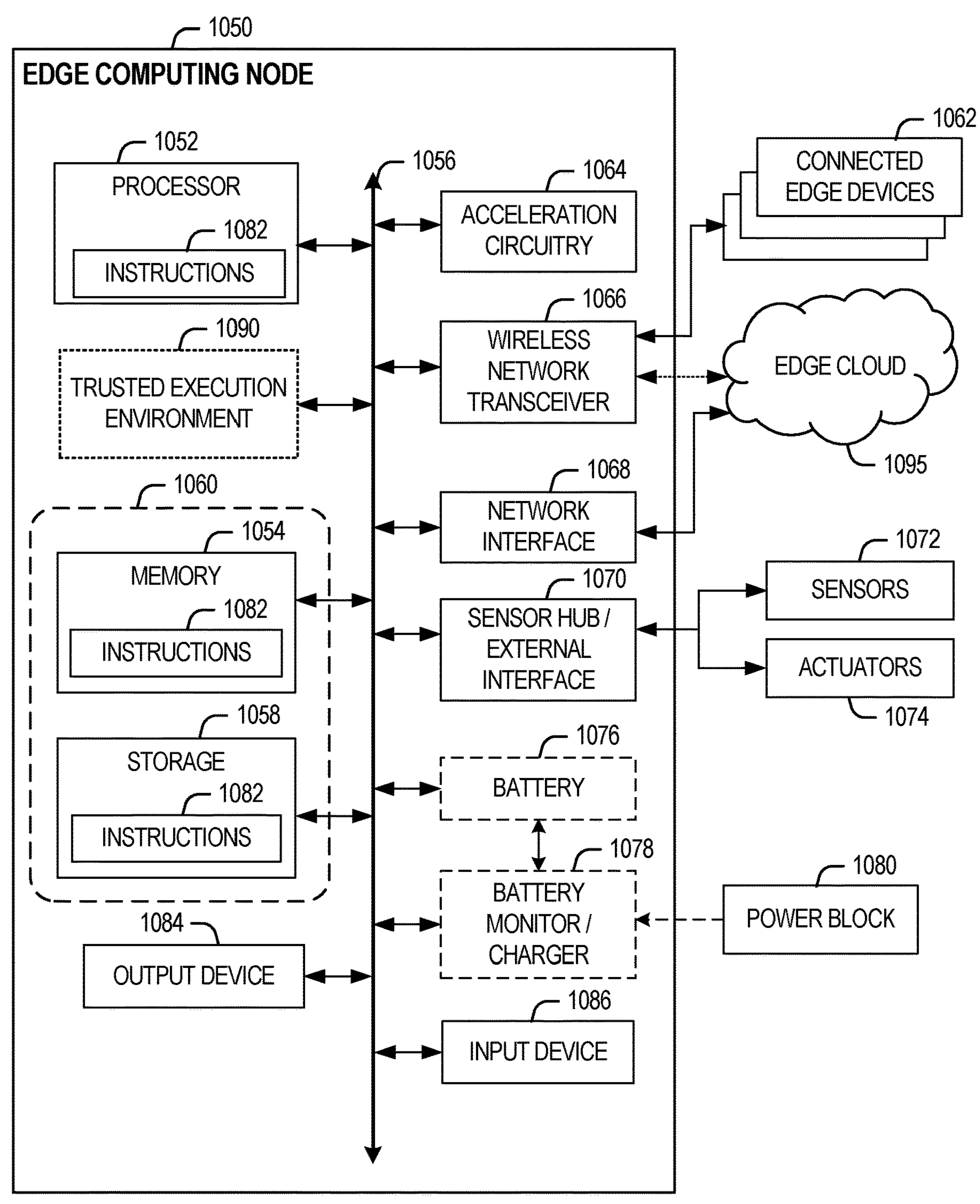
FIG. 10 provides a further overview of example components within a computing device in an Edge computing system.

In a more detailed example, FIG. 10 illustrates a block diagram of an example of components that may be present in an Edge computing node 1050 for implementing the techniques (e.g., operations, processes, methods, and methodologies) described herein. This Edge computing node 1050 provides a closer view of the respective components of node 900 when implemented as or as part of a computing device (e.g., as a mobile device, a base station, server, gateway, etc.). The Edge computing node 1050 may include any combination of the hardware or logical components referenced herein, and it may include or couple with any device usable with an Edge communication network or a combination of such networks. The components maD21y be implemented as integrated circuits (ICs), portions thereof, discrete electronic devices, or other modules, instruction sets, programmable logic or algorithms, hardware, hardware accelerators, software, firmware, or a combination thereof adapted in the Edge computing node 1050, or as components otherwise incorporated within a chassis of a larger system.

The Edge computing device 1050 may include processing circuitry in the form of a processor 1052, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1052 may be a part of a system on a chip (SoC) in which the processor 1052 and other components are formed into a single integrated circuit, or a single package, such as the Edison™ or Galileo™ SoC boards from Intel Corporation, Santa Clara, Calif. As an example, the processor 1052 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, Calif., a MIPS®-based design from MIPS Technologies, Inc. of Sunnyvale, Calif., an ARM®-based design licensed from ARM Holdings, Ltd., or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1052 and accompanying circuitry may be provided in a single socket form factor, multiple socket form factor, or a variety of other formats, including in limited hardware configurations or configurations that include fewer than all elements shown in FIG. 10.

The processor 1052 may communicate with a system memory 1054 over an interconnect 1056 (e.g., a bus). Any number of memory devices may be used to provide for a given amount of system memory. As examples, the memory 1054 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example, the storage 1058 may be implemented via a solid-state disk drive (SSDD). Other devices that may be used for the storage 1058 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1056 may couple the processor 1052 to a transceiver 1066, for communications with the connected Edge devices 1062. The transceiver 1066 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected Edge devices 1062. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1066 (or multiple transceivers) may communicate using multiple standards or radios for communications at a different range. For example, the Edge computing node 1050 may communicate with close devices, e.g., within about 10 meters, using a local transceiver based on Bluetooth Low Energy (BLE), or another low power radio, to save power. More distant connected Edge devices 1062, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1066 (e.g., a radio transceiver) may be included to communicate with devices or services in a cloud (e.g., an Edge cloud 1095) via local or wide area network protocols. The wireless network transceiver 1066 may be a low-power wide-area (LPWA) transceiver that follows the IEEE 802.15.4, or IEEE 802.15.4 g standards, among others. The Edge computing node 1050 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1066, as described herein. For example, the transceiver 1066 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1066 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1068 may be included to provide a wired communication to nodes of the Edge cloud 1095 or to other devices, such as the connected Edge devices 1062 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to enable connecting to a second network, for example, a first NIC 1068 providing communications to the cloud over Ethernet, and a second NIC 1068 providing communications to other devices over another type of network.

Given the variety of types of applicable communications from the device to another component or network, applicable communications circuitry used by the device may include or be embodied by any one or more of components 1064, 1066, 1068, or 1070. Accordingly, in various examples, applicable means for communicating (e.g., receiving, transmitting, etc.) may be embodied by such communications circuitry.

The Edge computing node 1050 may include or be coupled to acceleration circuitry 1064, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific Edge computing tasks for service management and service operations discussed elsewhere in this document.

The interconnect 1056 may couple the processor 1052 to a sensor hub or external interface 1070 that is used to connect additional devices or subsystems. The devices may include sensors 1072, such as accelerometers, level sensors, flow sensors, optical light sensors, camera sensors, temperature sensors, global navigation system (e.g., GPS) sensors, pressure sensors, barometric pressure sensors, and the like. The hub or interface 1070 further may be used to connect the Edge computing node 1050 to actuators 1074, such as power switches, valve actuators, an audible sound generator, a visual warning device, and the like.

In some optional examples, various input/output (I/O) devices may be present within or connected to, the Edge computing node 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the Edge computing node 1050. A display or console hardware, in the context of the present system, may be used to provide output and receive input of an Edge computing system; to manage components or services of an Edge computing system; identify a state of an Edge computing component or service; or to conduct any other number of management or administration functions or service use cases.

A battery 1076 may power the Edge computing node 1050, although, in examples in which the Edge computing node 1050 is mounted in a fixed location, it may have a power supply coupled to an electrical grid, or the battery may be used as a backup or for temporary capabilities. The battery 1076 may be a lithium ion battery, or a metal-air battery, such as a zinc-air battery, an aluminum-air battery, a lithium-air battery, and the like.

A battery monitor/charger 1078 may be included in the Edge computing node 1050 to track the state of charge (SoCh) of the battery 1076, if included. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1078 may communicate the information on the battery 1076 to the processor 1052 over the interconnect 1056. The battery monitor/charger 1078 may also include an analog-to-digital (ADC) converter that enables the processor 1052 to directly monitor the voltage of the battery 1076 or the current flow from the battery 1076. The battery parameters may be used to determine actions that the Edge computing node 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the Edge computing node 1050. A wireless battery charging circuit, such as an LTC4020 chip from Linear Technologies of Milpitas, Calif., among others, may be included in the battery monitor/charger 1078. The specific charging circuits may be selected based on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine-readable medium 1060 including code to direct the processor 1052 to perform electronic operations in the Edge computing node 1050. The processor 1052 may access the non-transitory, machine-readable medium 1060 over the interconnect 1056. For instance, the non-transitory, machine-readable medium 1060 may be embodied by devices described for the storage 1058 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 1060 may include instructions to direct the processor 1052 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Also in a specific example, the instructions 1082 on the processor 1052 (separately, or in combination with the instructions 1082 of the machine readable medium 1060) may configure execution or operation of a trusted execution environment (TEE) 1090. In an example, the TEE 1090 operates as a protected area accessible to the processor 1052 for secure execution of instructions and secure access to data. Various implementations of the TEE 1090, and an accompanying secure area in the processor 1052 or the memory 1054 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1050 through the TEE 1090 and the processor 1052.

While the illustrated examples of FIG. 9 and FIG. 10 include example components for a compute node and a computing device, respectively, examples disclosed herein are not limited thereto. As used herein, a "computer" may include some or all of the example components of FIGS. 9 and/or 10 in different types of computing environments. Example computing environments include Edge computing devices (e.g., Edge computers) in a distributed networking arrangement such that particular ones of participating Edge computing devices are heterogenous or homogeneous devices. As used herein, a "computer" may include a personal computer, a server, user equipment, an accelerator, etc., including any combinations thereof. In some examples, distributed networking and/or distributed computing includes any number of such Edge computing devices as illustrated in FIGS. 9 and/or 10, each of which may include different sub-components, different memory capacities, I/O capabilities, etc. For example, because some implementations of distributed networking and/or distributed computing are associated with particular desired functionality, examples disclosed herein include different combinations of components illustrated in FIGS. 9 and/or 10 to satisfy functional objectives of distributed computing tasks. In some examples, the term "compute node" or "computer" only includes the example processor 904, memory 906 and I/O subsystem 908 of FIG. 9. In some examples, one or more objective functions of a distributed computing task(s) rely on one or more alternate devices/structure located in different parts of an Edge networking environment, such as devices to accommodate data storage (e.g., the example data storage 910), input/output capabilities (e.g., the example peripheral device(s) 914), and/or network communication capabilities (e.g., the example NIC 920).

In some examples, computers operating in a distributed computing and/or distributed networking environment (e.g., an Edge network) are structured to accommodate particular objective functionality in a manner that reduces computational waste. For instance, because a computer includes a subset of the components disclosed in FIGS. 9 and 10, such computers satisfy execution of distributed computing objective functions without including computing structure that would otherwise be unused and/or underutilized. As such, the term "computer" as used herein includes any combination of structure of FIGS. 9 and/or 10 that is capable of satisfying and/or otherwise executing objective functions of distributed computing tasks. In some examples, computers are structured in a manner commensurate to corresponding distributed computing objective functions in a manner that downscales or upscales in connection with dynamic demand. In some examples, different computers are invoked and/or otherwise instantiated in view of their ability to process one or more tasks of the distributed computing request(s), such that any computer capable of satisfying the tasks proceed with such computing activity.

In the illustrated examples of FIGS. 9 and 10, computing devices include operating systems. As used herein, an "operating system" is software to control example computing devices, such as the example Edge compute node 900 of FIG. 9 and/or the example Edge compute node 1050 of FIG. 10. Example operating systems include, but are not limited to, consumer-based operating systems (e.g., Microsoft® Windows® 10, Google® Android® OS, Apple® Mac® OS, etc.). Example operating systems also include, but are not limited to industry-focused operating systems, such as real-time operating systems, hypervisors, etc. An example operating system on a first Edge compute node may be the same or different than an example operating system on a second Edge compute node. In some examples, the operating system invokes alternate software to facilitate one or more functions and/or operations that are not native to the operating system, such as particular communication protocols and/or interpreters. In some examples, the operating system instantiates various functionalities that are not native to the operating system. In some examples, operating systems include varying degrees of complexity and/or capabilities. For instance, a first operating system corresponding to a first Edge compute node includes a real-time operating system having particular performance expectations of responsivity to dynamic input conditions, and a second operating system corresponding to a second Edge compute node includes graphical user interface capabilities to facilitate end-user I/O.

Additional Notes and Examples

Example 1 is a system for adaptive resilient network communication, the system comprising: processing circuitry; and memory, coupled to the processing circuitry, the memory including instructions stored thereon that, when executed by the processing circuitry cause the processing circuitry to perform operations, the operations comprising: monitoring network traffic on multiple pathways between a user equipment and an application or a service at a network destination; gathering network telemetry data from the monitored network traffic; inputting the network telemetry data into a trained artificial intelligence model; classifying the network telemetry data using the model; determining, using the model, an anomaly condition in at least a portion of the multiple pathways; and in response to the determining, selecting a mitigation technique for the at least a portion of the multiple pathways.

In Example 2, the subject matter of Example 1 optionally includes wherein the anomaly condition corresponds to a current condition in the at least a portion of the multiple pathways.

In Example 3, the subject matter of any one or more of Examples 1-2 optionally include wherein the anomaly condition corresponds to a predicted future condition in the at least a portion of the multiple pathways, and wherein the predicted future condition is based at least in part on a real-time location of the user equipment.

In Example 4, the subject matter of any one or more of Examples 1-3 optionally include wherein the at least a portion of the multiple pathways includes at least one of: a radio access point, an access network, a core network, a network endpoint, or a path therebetween in one or more network types.

In Example 5, the subject matter of any one or more of Examples 1-4 optionally include the operations further comprising: training the model using the classified network telemetry data.

In Example 6, the subject matter of any one or more of Examples 1-5 optionally include wherein the network telemetry data includes at least one of: a channel quality, a real-time network load, a sub-network condition, or a node radiality.

In Example 7, the subject matter of any one or more of Examples 1-6 optionally include wherein the model receives additional data from an application programming interface (API) via an end-to-end socket.

In Example 8, the subject matter of Example 7 optionally includes wherein the additional data includes at least one of a Quality of Service (QoS) requirement, a reliability requirement, or a latency requirement of the application.

In Example 9, the subject matter of any one or more of Examples 1-8 optionally include wherein the user equipment is connected to a particular active pathway of the multiple pathways, wherein the particular active pathway is of a first type, and wherein the mitigation technique includes: at least one of activating or adding a second particular pathway of the multiple pathways, or replicating at least a portion of the particular active pathway; and routing at least a portion of data or traffic from the user equipment on at least one of the second particular pathway or the replicated portion of the particular active pathway or re-routing at least a portion of data or traffic from the user equipment to a different active pathway type.

In Example 10, the subject matter of any one or more of Examples 1-9 optionally include wherein the multiple pathways are pathways on at least one of a satellite network, a broadband network, a wireless network, or a mobile network.

In Example 11, the subject matter of any one or more of Examples 1-10 optionally include the operations further comprising: determining a risk score for the network telemetry data over one or more of the multiple pathways; and comparing the risk score to a lower thresholding value and an upper thresholding value, and wherein the mitigation technique is selected based at least in part on the risk score.

In Example 12, the subject matter of Example 11 optionally includes wherein in response to the risk score falling between the lower thresholding value and the upper thresholding value, the risk score is recalculated until a moving window average for the risk score and a latest value of the risk score drops below the lower thresholding value or crosses above the upper thresholding value.

In Example 13, the subject matter of any one or more of Examples 1-12 optionally include wherein the mitigation technique includes: replicating or adding at least one of a network service, a network resource, or a network component; and migrating at least one of a task, at least a portion of the monitored network traffic, or data from the user equipment to the at least one of the replicated or added network service, network resource, or network component.

Example 14 is a method for implementing adaptive resilient network protocols, the method comprising: monitoring network traffic on multiple pathways between a user equipment and an application or a micro-service at a network destination; gathering network telemetry data from the monitored network traffic; inputting the network telemetry data into a trained artificial intelligence model; classifying the network telemetry data using the model; determining, using the model, an anomaly condition in at least a portion of the multiple pathways; and in response to the determining, selecting a mitigation technique for at least one pathway of the multiple pathways.

In Example 15, the subject matter of Example 14 optionally includes wherein the anomaly condition corresponds to a current condition in the at least a portion of the multiple pathways.

In Example 16, the subject matter of any one or more of Examples 14-15 optionally include wherein the anomaly condition corresponds to a predicted future condition in the at least a portion of the multiple pathways, and wherein the predicted future condition is based at least in part on a real-time location of the user equipment.

In Example 17, the subject matter of any one or more of Examples 14-16 optionally include wherein the at least a portion of the multiple pathways includes at least one of: a radio access point, an access network, a core network, a network endpoint, or a path therebetween.

In Example 18, the subject matter of any one or more of Examples 14-17 optionally include training the model using the classified network telemetry data.

In Example 19, the subject matter of any one or more of Examples 14-18 optionally include wherein the network telemetry data includes at least one of: a channel quality, a real-time network load, a sub-network condition, or a node radiality.

In Example 20, the subject matter of any one or more of Examples 14-19 optionally include wherein the model receives additional data from an application programming interface (API) via an end-to-end socket.

In Example 21, the subject matter of Example 20 optionally includes wherein the additional data includes at least one of a Quality of Service (QoS) requirement, a reliability requirement, or a latency requirement from the application via the application.

In Example 22, the subject matter of any one or more of Examples 14-21 optionally include wherein the user equipment is connected to a particular active pathway of the multiple pathways the mitigation technique includes: at least one of activating or adding a second particular pathway of the multiple pathways, or replicating at least a portion of the particular active pathway; and routing at least a portion of data or traffic from the user equipment on at least one of the second particular pathway or the replicated portion of the particular active pathway.

In Example 23, the subject matter of any one or more of Examples 14-22 optionally include wherein the multiple pathways are pathways on at least one of a satellite network, a broadband network, a wireless network, or a mobile network.

In Example 24, the subject matter of any one or more of Examples 14-23 optionally include determining a risk score for the network telemetry data over the network; and comparing the risk score to a lower thresholding value and an upper thresholding value, and wherein the mitigation technique is selected based at least in part on the risk score.

In Example 25, the subject matter of Example 24 optionally includes wherein in response to the risk score falling between the lower thresholding value and the upper thresholding value, the risk score is recalculated until a moving window average for the risk score and a latest value of the risk score drops below the lower thresholding value or crosses above the upper thresholding value.

In Example 26, the subject matter of any one or more of Examples 14-25 optionally include wherein the mitigation technique includes: replicating or adding at least one of a network service, a network resource, or a network component; and migrating at least one of a task, the monitored network traffic, or data from the user equipment to the at least one of the replicated or added network service, network resource, or network component.

Example 27 is at least one non-transitory machine-readable medium with instructions stored thereon, which when executed by a processor of a computing device, cause the processor to execute operations, the operations comprising: monitoring network traffic on multiple pathways between a user equipment and an application or a service at a network destination; gathering network telemetry data from the monitored network traffic; inputting the network telemetry data into a trained artificial intelligence model; classifying the network telemetry data using the model; determining, using the model, an anomaly condition in at least a portion of the multiple pathways; and in response to the determining, selecting a mitigation technique for at least one pathway of the multiple pathways.

In Example 28, the subject matter of Example 27 optionally includes wherein the anomaly condition corresponds to a current condition in the at least a portion of the multiple pathways.

In Example 29, the subject matter of any one or more of Examples 27-28 optionally include wherein the anomaly condition corresponds to a predicted future condition in the at least a portion of the multiple pathways, and wherein the predicted future condition is based at least in part on a real-time location of the user equipment.

In Example 30, the subject matter of any one or more of Examples 27-29 optionally include wherein the at least a portion of the multiple pathways includes at least one of: a radio access point, an access network, a core network, a network endpoint, or a path therebetween.

In Example 31, the subject matter of any one or more of Examples 27-30 optionally include the operations further comprising: training the model using the classified network telemetry data.

In Example 32, the subject matter of any one or more of Examples 27-31 optionally include wherein the network telemetry data includes at least one of: a channel quality, a real-time network load, a sub-network condition, or a node radiality.

In Example 33, the subject matter of any one or more of Examples 27-32 optionally include wherein the model receives additional data from an application programming interface (API) via an end-to-end socket.

In Example 34, the subject matter of Example 33 optionally includes wherein the additional data includes at least one of a Quality of Service (QoS) requirement, a reliability requirement, or a latency requirement from the application via the application.

In Example 35, the subject matter of any one or more of Examples 27-34 optionally include wherein the user equipment is connected to a particular active pathway of the multiple pathways the mitigation technique includes: at least one of activating or adding a second particular pathway of the multiple pathways, or replicating at least a portion of the particular active pathway; and routing at least a portion of data or traffic from the user equipment on at least one of the second particular pathway or the replicated portion of the particular active pathway.

In Example 36, the subject matter of any one or more of Examples 27-35 optionally include wherein the multiple pathways are pathways on at least one of a satellite network, a broadband network, a wireless network, or a mobile network.

In Example 37, the subject matter of any one or more of Examples 27-36 optionally include the operations further comprising: determining a risk score for the network telemetry data over the network; and comparing the risk score to a lower thresholding value and an upper thresholding value, and wherein the mitigation technique is selected based at least in part on the risk score.

In Example 38, the subject matter of Example 37 optionally includes wherein in response to the risk score falling between the lower thresholding value and the upper thresholding value, the risk score is recalculated until a moving window average for the risk score and a latest value of the risk score drops below the lower thresholding value or crosses above the upper thresholding value.

In Example 39, the subject matter of any one or more of Examples 27-38 optionally include wherein the mitigation technique includes: replicating or adding at least one of a network service, a network resource, or a network component; and migrating at least one of a task, the monitored network traffic, or data from the user equipment to the at least one of the replicated or added network service, network resource, or network component.

Example 40 is a system for adaptive resilient network communication, the system comprising: means for monitoring network traffic on multiple pathways between a user equipment and an application or a service at a network destination; means for gathering network telemetry data from the monitored network traffic; means for inputting the network telemetry data into a trained artificial intelligence model; means for classifying the network telemetry data using the model; means for determining, using the model, an anomaly condition in at least a portion of the multiple pathways; and means for, in response to the determining, selecting a mitigation technique for at least one pathway of the multiple pathways.

In Example 41, the subject matter of Example 40 optionally includes wherein the anomaly condition corresponds to a current condition in the at least a portion of the multiple pathways.

In Example 42, the subject matter of any one or more of Examples 40-41 optionally include wherein the anomaly condition corresponds to a predicted future condition in the at least a portion of the multiple pathways, and wherein the predicted future condition is based at least in part on a real-time location of the user equipment.

In Example 43, the subject matter of any one or more of Examples 40-42 optionally include wherein the at least a portion of the multiple pathways includes at least one of: a radio access point, an access network, a core network, a network endpoint, or a path therebetween in one or more network types.

In Example 44, the subject matter of any one or more of Examples 40-43 optionally include means for training the model using the classified network telemetry data.

In Example 45, the subject matter of any one or more of Examples 40-44 optionally include wherein the network telemetry data includes at least one of: a channel quality, a real-time network load, a sub-network condition, or a node radiality.

In Example 46, the subject matter of any one or more of Examples 40-45 optionally include wherein the model receives additional data from an application programming interface (API) via an end-to-end socket.

In Example 47, the subject matter of Example 46 optionally includes wherein the additional data includes at least one of a Quality of Service (QoS) requirement, a reliability requirement, or a latency requirement of the application.

In Example 48, the subject matter of any one or more of Examples 40-47 optionally include wherein the user equipment is connected to a particular active pathway of the multiple pathways the mitigation technique includes: at least one of activating or adding a second particular pathway of the multiple pathways, or replicating at least a portion of the particular active pathway; and routing at least a portion of data or traffic from the user equipment on at least one of the second particular pathway or the replicated portion of the particular active pathway.

In Example 49, the subject matter of any one or more of Examples 40-48 optionally include wherein the multiple pathways are pathways on at least one of a satellite network, a broadband network, a wireless network, or a mobile network.

In Example 50, the subject matter of any one or more of Examples 40-49 optionally include means for determining a risk score for the network telemetry data over one or more of the multiple pathways; and means for comparing the risk score to a lower thresholding value and an upper thresholding value, and wherein the mitigation technique is selected based at least in part on the risk score.

In Example 51, the subject matter of Example 50 optionally includes wherein in response to the risk score falling between the lower thresholding value and the upper thresholding value, the risk score is recalculated until a moving window average for the risk score and a latest value of the risk score drops below the lower thresholding value or crosses above the upper thresholding value.

In Example 52, the subject matter of any one or more of Examples 40-51 optionally include wherein the mitigation technique includes: replicating or adding at least one of a network service, a network resource, or a network component; and migrating at least one of a task, at least a portion of the monitored network traffic, or data from the user equipment to the at least one of the replicated or added network service, network resource, or network component.

It should be understood that the functional units or capabilities described in this specification may have been referred to or labeled as components, circuitry, engines, or modules in order to more particularly emphasize their implementation independence. Such components may be embodied by a variety of hardware-based forms, including hardware that executes program instructions stored in a non-transitory storage medium. For example, a component, circuit, engine, or module may be implemented as a hardware circuit comprising a very-large-scale integration (VLSI) circuits or gate arrays, off-the-shelf semiconductors such as logic chips, transistors, or other discrete components. A component, circuit, engine, or module may also be implemented in programmable hardware devices such as field programmable arrays, programmable array logic, programmable logic devices, or the like. In the case where a component, circuit, engine, or module incorporates and executes program instructions, it should be noted that those instructions may comprise one or more physical or logical blocks of computer instructions, which may, for instance, be organized as an object, procedure, or function. Nevertheless, the program instructions executable as part of a component, circuit, engine, or module need not be physically located together, but may comprise disparate instructions stored in different locations which, when joined logically together, comprise the component or module and achieve the stated purpose for the component, circuit, engine, or module.

It is further understood that the term "engine" may refer to a program (e.g., in operating systems, subsystems, or applications), a component, or a series of components that perform core or essential functions (e.g., for other programs), and may use an algorithm (e.g., a deep learning algorithm) to query data and make a recommendation or a determination based on the queried data. The engine may be constructed, architected, or implemented using fixed circuitry such as CPU cores or programmable circuitry such as a Field Programmable Gate Array (FPGA). The engine may be designed for an AI accelerator, an Infrastructure Processing Unit (IPU), a Data Processing Unit (DPU), a Network Processing Unit (NPU), or any component that performs specialized data processing.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A system for adaptive resilient network communication, the system comprising:

processing circuitry; and memory, coupled to the processing circuitry, the memory including instructions stored thereon that, when executed by the processing circuitry cause the processing circuitry to perform operations, the operations comprising:

monitoring network traffic on multiple pathways between a user equipment and an application or a service at a network destination, wherein the multiple pathways include pathways of different network types, and wherein the different network types include at least two of: a broadband network, a wireless network, or a mobile network;

gathering network telemetry data from the monitored network traffic;

inputting the network telemetry data into a trained artificial intelligence model, wherein the trained artificial intelligence model receives additional data from an application programming interface (API) via an end-to-end socket, and wherein the additional data includes at least one of a Quality of Service (QOS) requirement, a reliability requirement, or a latency requirement of the application;

classifying the network telemetry data using the trained artificial intelligence model;

determining, using the trained artificial intelligence model, an anomaly condition in at least a portion of the multiple pathways; and in response to the determining, selecting a mitigation technique for the at least a portion of the multiple pathways.

2. The system of claim 1, wherein the anomaly condition corresponds to a current condition in the at least a portion of the multiple pathways.

3. The system of claim 1, wherein the anomaly condition corresponds to a predicted future condition in the at least a portion of the multiple pathways, and wherein the predicted future condition is based at least in part on a real-time location of the user equipment.

4. The system of claim 1, wherein the at least a portion of the multiple pathways includes at least one of:

a radio access point, an access network, a core network, a network endpoint, or a path therebetween in one or more network types.

5. The system of claim 1, the operations further comprising:

training the trained artificial intelligence model using the classified network telemetry data.

6. The system of claim 1, wherein the network telemetry data includes at least one of: a channel quality, a real-time network load, a sub-network condition, or a node radiality.

7. The system of claim 1, wherein the user equipment is connected to a particular active pathway of the multiple pathways, wherein the particular active pathway is of a first type, and wherein the mitigation technique includes:

at least one of activating or adding a second particular pathway of the multiple pathways, or replicating at least a portion of the particular active pathway; and routing at least a portion of data or traffic from the user equipment on at least one of the second particular pathway or the replicated portion of the particular active pathway or re-routing at least a portion of data or traffic from the user equipment to a different active pathway type.

8. The system of claim 1, wherein the multiple pathways further include a pathway on a satellite network.

9. The system of claim 1, the operations further comprising:

determining a risk score for the network telemetry data over one or more of the multiple pathways; and comparing the risk score to a lower thresholding value and an upper thresholding value, and wherein the mitigation technique is selected based at least in part on the risk score.

10. The system of claim 9, wherein in response to the risk score falling between the lower thresholding value and the upper thresholding value, the risk score is recalculated until a moving window average for the risk score and a latest value of the risk score drops below the lower thresholding value or crosses above the upper thresholding value.

11. A method for implementing adaptive resilient network communication, the method comprising:

monitoring network traffic on multiple pathways between a user equipment and an application or a micro-service at a network destination, wherein the multiple pathways include pathways of different network types, and wherein the different network types include at least two of:

a broadband network, a wireless network, or a mobile network;

gathering network telemetry data from the monitored network traffic;

inputting the network telemetry data into a trained artificial intelligence model;

receiving, by the trained artificial intelligence model, additional data from an application programming interface (API) via an end-to-end socket, wherein the additional data includes at least one of a Quality of Service (QOS) requirement, a reliability requirement, or a latency requirement of the application;

classifying the network telemetry data using the trained artificial intelligence model;

determining, using the trained artificial intelligence model, an anomaly condition in at least a portion of the multiple pathways; and in response to the determining, selecting a mitigation technique for at least one pathway of the multiple pathways.

12. The method of claim 11, wherein the anomaly condition corresponds to a current condition in the at least a portion of the multiple pathways.

13. The method of claim 11, wherein the anomaly condition corresponds to a predicted future condition in the at least a portion of the multiple pathways, and wherein the predicted future condition is based at least in part on a real-time location of the user equipment.

14. The method of claim 11, wherein the user equipment is connected to a particular active pathway of the multiple pathways and the mitigation technique includes:

at least one of activating or adding a second particular pathway of the multiple pathways, or replicating at least a portion of the particular active pathway; and routing at least a portion of data or traffic from the user equipment on at least one of the second particular pathway or the replicated portion of the particular active pathway.

15. The method of claim 11, further comprising:

determining a risk score for the network telemetry data over one or more of the multiple pathways; and comparing the risk score to a lower thresholding value and an upper thresholding value, and wherein the mitigation technique is selected based at least in part on the risk score.

16. The method of claim 15, wherein in response to the risk score falling between the lower thresholding value and the upper thresholding value, the risk score is recalculated until a moving window average for the risk score and a latest value of the risk score drops below the lower thresholding value or crosses above the upper thresholding value.

17. The method of claim 11, wherein the mitigation technique includes:

replicating or adding at least one of a network service, a network resource, or a network component; and migrating at least one of a task, at least a portion of the monitored network traffic, or data from the user equipment to the at least one of the replicated or added network service, network resource, or network component.

18. At least one non-transitory machine-readable medium with instructions stored thereon, which when executed by a processor of a computing device, cause the processor to execute operations, the operations comprising:

monitoring network traffic on multiple pathways between a user equipment and an application or a service at a network destination, wherein the multiple pathways include pathways of different network types, and wherein the different network types include at least two of: a broadband network, a wireless network, or a mobile network;

gathering network telemetry data from the monitored network traffic;

inputting the network telemetry data into a trained artificial intelligence model, wherein the trained artificial intelligence model receives additional data from an application programming interface (API) via an end-to-end socket, and wherein the additional data includes at least one of a Quality of Service (QOS) requirement, a reliability requirement, or a latency requirement of the application;

classifying the network telemetry data using the trained artificial intelligence model;

determining, using the trained artificial intelligence model, an anomaly condition in at least a portion of the multiple pathways; and in response to the determining, selecting a mitigation technique for at least one pathway of the multiple pathways.

19. The at least one non-transitory machine-readable medium of claim 18, wherein the anomaly condition corresponds to at least one of a current condition in the at least a portion of the multiple pathways, or a predicted future condition in the at least a portion of the multiple pathways, and wherein the predicted future condition is based at least in part on a real-time location of the user equipment.

20. The at least one non-transitory machine-readable medium of claim 18, wherein the at least a portion of the multiple pathways includes at least one of: a radio access point, an access network, a core network, a network endpoint, or a path therebetween in the different network types.

21. The at least one non-transitory machine-readable medium of claim 18, the operations further comprising:

training the trained artificial intelligence model using the classified network telemetry data.

22. The at least one non-transitory machine-readable medium of claim 18, wherein the user equipment is connected to a particular active pathway of the multiple pathways and wherein the mitigation technique includes:

at least one of activating or adding a second particular pathway of the multiple pathways, or replicating at least a portion of the particular active pathway; and routing at least a portion of data or traffic from the user equipment on at least one of the second particular pathway or the replicated portion of the particular active pathway.

23. The at least one non-transitory machine-readable medium of claim 18, the operations further comprising:

determining a risk score for the network telemetry data over one or more of the multiple pathways; and comparing the risk score to a lower thresholding value and an upper thresholding value, and wherein the mitigation technique is selected based at least in part on the risk score;

wherein in response to the risk score falling between the lower thresholding value and the upper thresholding value, the risk score is recalculated until a moving window average for the risk score and a latest value of the risk score drops below the lower thresholding value or crosses above the upper thresholding value.

* * * * *